United States Patent [19]
Tabata et al.

[11] Patent Number: 5,323,198
[45] Date of Patent: Jun. 21, 1994

[54] FILM WINDING APPARATUS

[75] Inventors: Yasushi Tabata; Norio Numako; Takuma Sato, all of Tokyo, Japan

[73] Assignee: Asahi Kogaku Kogyo Kabushiki Kaisha, Tokyo, Japan

[21] Appl. No.: 962,847

[22] Filed: Oct. 19, 1992

[30] Foreign Application Priority Data

Oct. 17, 1991 [JP] Japan .................. 3-298336
Oct. 17, 1991 [JP] Japan .................. 3-298337

[51] Int. Cl.5 ............................................. G03B 1/18
[52] U.S. Cl. ................................................ 354/173.1
[58] Field of Search ............... 354/173.1, 173.11, 217, 354/218

[56] References Cited

U.S. PATENT DOCUMENTS

| | | | |
|---|---|---|---|
| 4,417,793 | 11/1983 | Oyokota et al. | 354/21 |
| 4,779,109 | 10/1988 | Kawamura et al. | 354/21 |
| 4,996,549 | 2/1991 | Yamaguchi | 354/173.11 |
| 5,091,740 | 2/1992 | Hori | 354/173.1 |
| 5,130,728 | 7/1992 | Goto et al. | 354/105 |
| 5,136,314 | 8/1992 | Kazami et al. | 354/173.1 |

FOREIGN PATENT DOCUMENTS

| | | |
|---|---|---|
| 0359512 | 3/1990 | European Pat. Off. . |
| 0464653 | 1/1992 | European Pat. Off. . |
| 57-56835 | 4/1982 | Japan . |
| 57-04529 | 12/1982 | Japan . |
| 64-33537 | 2/1989 | Japan . |
| 0133537 | 2/1989 | Japan . |
| 2-256038 | 10/1990 | Japan . |
| 2086065 | 5/1982 | United Kingdom . |

OTHER PUBLICATIONS

Patent Abstracts of Japan, vol. 15, No. 11 (P-1150), Jan. 10, 1991.
Patent Abstracts of Japan, vol. 13, No. 219 (P-875), May 23, 1989.
Patent Abstracts of Japan, vol. 6, No. 133 (P-129), Jul. 20, 1982.
French Search Report and Annex.

Primary Examiner—Russell E. Adams
Assistant Examiner—Nicholas J. Tuccillo
Attorney, Agent, or Firm—Sandler Greenblum & Bernstein

[57] ABSTRACT

A film winding apparatus of a camera for winding and/or rewinding a perforated film. The film winding apparatus includes a photoelectric member that is opposed to perforations of the film to detect presence or absence of the perforations in the film. A predetermined reference value, along with an upper threshold value and a lower threshold value, is set in accordance with an initial signal output by the photoelectric member. A second mechanism detects a feed position of the film by comparing a rising output curve and a descending output curve produced by the photoelectric member with the upper and lower threshold values of the predetermined reference value.

23 Claims, 26 Drawing Sheets

FILM WINDING APPARATUS

BACKGROUND OF THE INVENTION

1. Field of the Invention

The present invention relates to a film winding apparatus of a camera. More precisely, it relates to a film winding apparatus in which a film feed can be precisely and reliably detected by a photoelectric element.

2. Description of Related Art

To detect the feed position of a film, upon loading the film, the winding film, or rewinding the film, in a film winding apparatus of a conventional camera, an electric switch is mechanically actuated by a sprocket, which is engaged with perforations of the film. It is difficult, however, to ensure reliability of such a mechanically actuated electric switch. To this end, particularly in recent electronic cameras, it is known to provide a photoelectric element, such as a photoreflector, for counting the number of perforations of the film to detect the feed position thereof.

The photoelectric element can provide for a more reliable operation of the apparatus, but has a drawback in that the output value of the photoreflector fluctuates depending on the particular film that is used. The output of the photoreflector may also fluctuate due to irregular characteristics of the photoreflector. In such a case, for example, it is necessary to compare the output signal of the photoelectric element with a predetermined threshold value (corresponding to the presence or absence of a perforation) and count the times that the output signal intersects the threshold value in order to count the number of perforations. However, if there is a large variation in the output level of the photoelectric element, the output level might not reach the threshold value, resulting in an incorrect number of counted perforations.

SUMMARY OF THE INVENTION

A primary object of the present invention is to provide a film winding apparatus of a camera in which the number of perforations of the film can be precisely and reliably detected by a photoelectric element.

In order to achieve the object mentioned above, there is provided a film winding apparatus of a camera that includes a film feeding mechanism for winding and/or rewinding a perforated film. The apparatus includes a photoelectric member, opposed to the perforations of the film, to detect the presence or absence of the perforations. The apparatus further includes a mechanism for setting a predetermined reference value in accordance with the detection signal of the photoelectric member upon the feeding of the film by the film feeding mechanism. The apparatus further includes a mechanism for detecting the feed position of the film by comparing the set reference value and the detection signal of the photoelectric member.

The present disclosure relates to subject matter, contained in Japanese patent application Nos. HEI 3-298336 and HEI 3-298337. (both filed on Oct. 17, 1991) which are expressly incorporated herein by reference in its entirety.

BRIEF DESCRIPTION OF THE DRAWINGS

The invention will be described below in detail with reference to the accompanying drawings, in which.

DESCRIPTION OF THE PREFERRED EMBODIMENT

Figure 1:
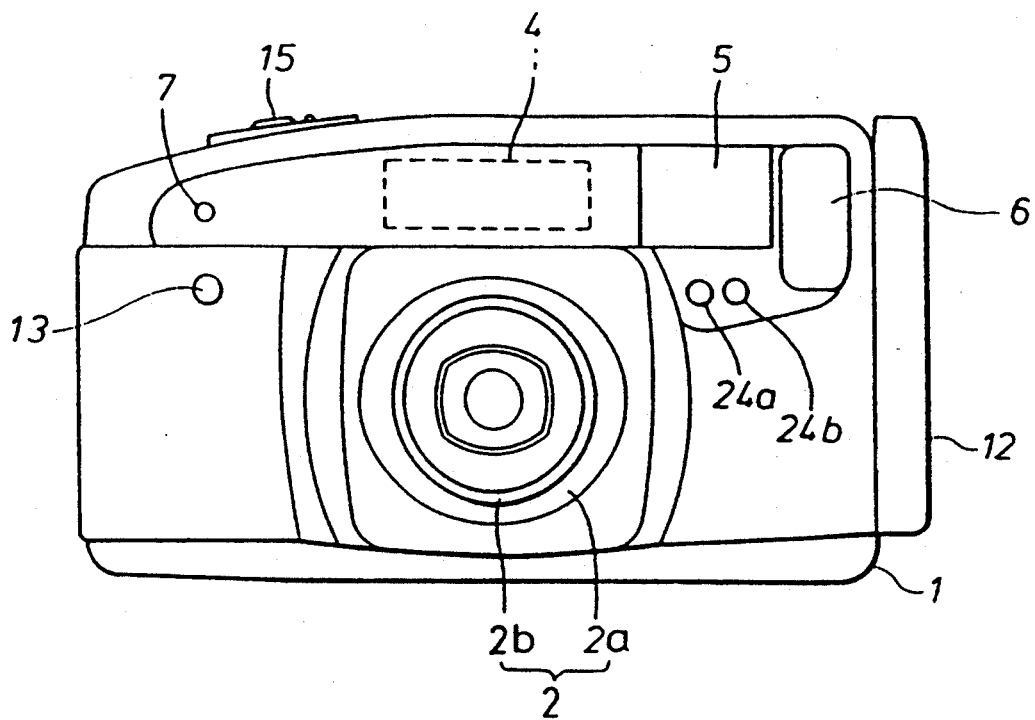
FIG. 1 is a front elevational view of a camera according to the present invention.
Figure 2:
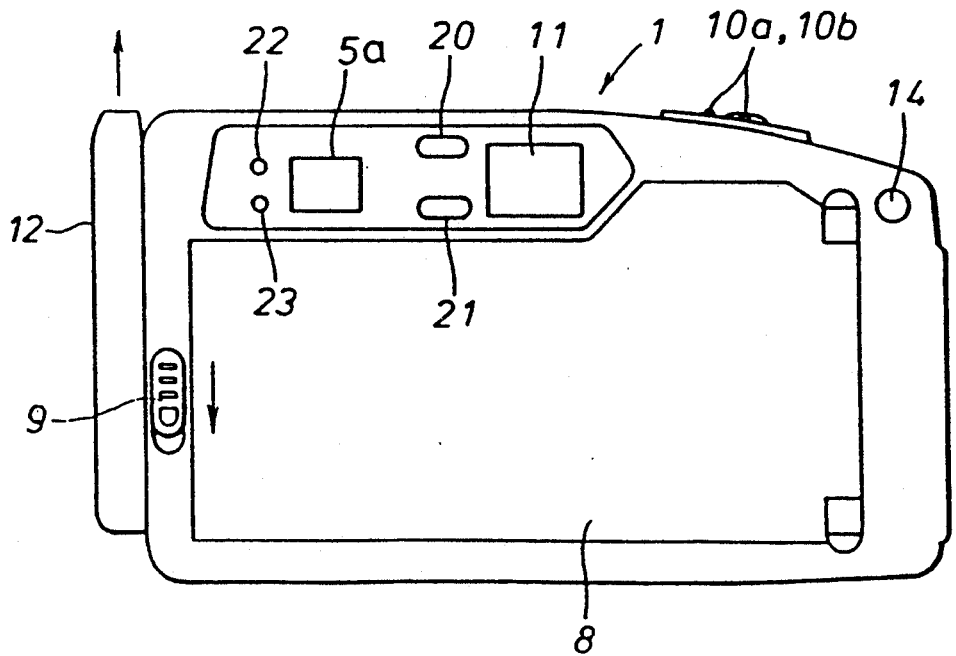
FIG. 2 is a back view of a camera shown in FIG. 1.
Figure 3:
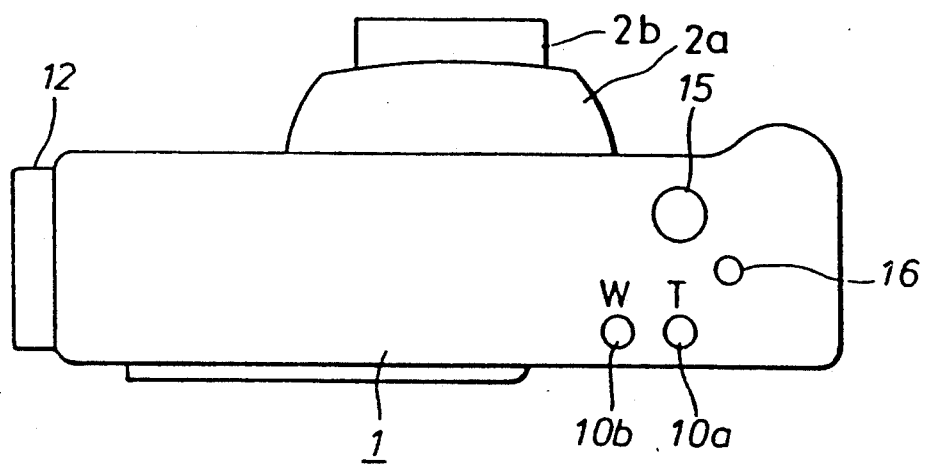
FIG. 3 is a plan view of a camera shown in FIG. 1.

FIGS. 1 through 3 show an embodiment of a remote control camera according to the present invention.

A remote control camera has a camera body 1 and a remote control unit 12 which is detachably attached to the camera body 1. The camera body 1 includes a powered zoom lens 2 having a stationary zoom lens barrel 2a and a movable zoom lens barrel 2b, an object distance measuring device 4, a view finder 5, and a strobe 6, similar to a conventional camera. The camera body 1 is provided on an upper end of a front face thereof, with a red self-timer lamp 7 which flickers at a relatively long time interval when the remote control unit 12 is detached from the camera body 1 and continuously flickers or is lighted in some manner for a relatively short time interval in accordance with operational states when a self timer function operates.

As can be seen in FIG. 2, a back cover 8 of the camera can be opened by a back cover opening lever 9. The movable lens barrel 2b is continuously moved between a telephoto position and a wide-angle position by a telephoto button 10a and a wide-angle button 10b provided on the top of the camera body 1. Various states or functions of the camera are indicated in an LCD (liquid crystal display) window 11. The camera body 1 is provided, on the front and rear faces thereof, with remote control light receiving windows 13 and 14 which receive infrared light emitted from the remote control unit 12, respectively. Numerals 15 and 16 designate a shutter button and a power button, provided on the top of the camera body 1, respectively.

Camera body 1 is provided on the back thereof with a mode selection button 20 which selects exposure modes of the camera, a drive button 21 which selects drive modes of the camera, a green lamp 22 which indicates the focus state of an autofocus function, and a red lamp 23 which flickers during the strobe charging and lights when strobe light is emitted. These elements 20, 21, 22 and 23 are provided in the vicinity of an eyepiece portion 5a of a view finder to surround the same. A pair of photometering windows 24a and 24b are provided below the view finder 5 on the front surface of the camera body 1.

Figure 4:
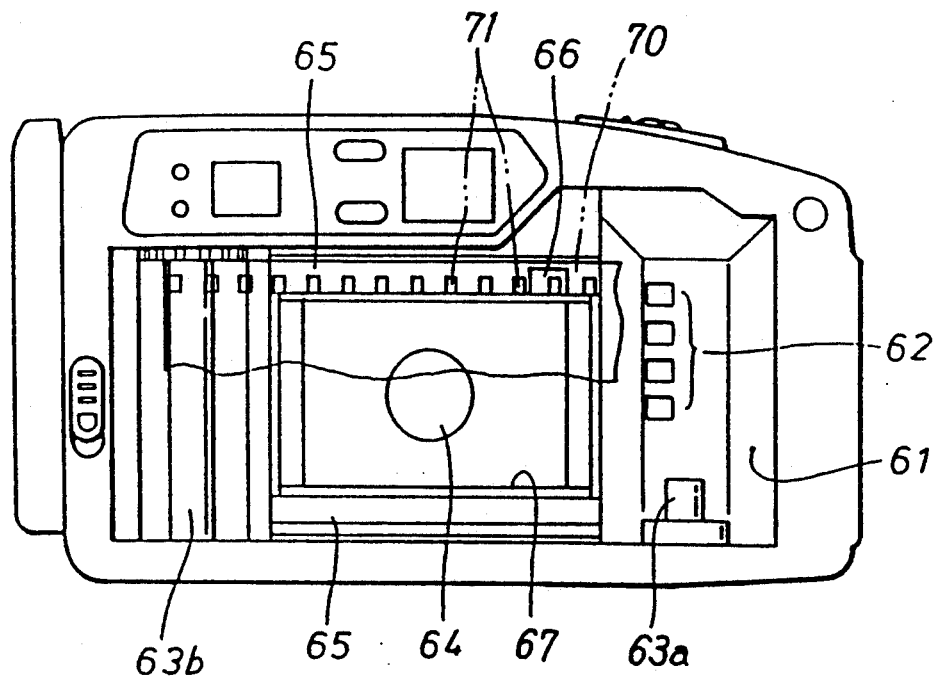
FIG. 4 is a back view of a camera with a removed back cover, according to the present invention

As can be seen on the right side of the camera shown in FIG. 4, when the back cover 8 is open, there is, a recess 61 that receives therein a film patrone DX contacts 62 that come into contact with the portion of a DX code provided on the patrone that represents a film sensitivity; and a rewinding shaft 63a that serves to rewind a film 70. At the left side of the camera shown in FIG. 4 is a winding shaft 63b for winding the film. At the intermediate portion, between the left and right is an aperture frame 67 in the camera body that defines a picture plane. A pair of double rail guides 65 are provided above and below the aperture frame 67 to guide and hold the film 70. One of the guide rails 65 that is opposed to perforations 71 of the film 70 is provided with a photoreflector 66 having a light emitting diode and a photo diode in combination.

Figure 5:
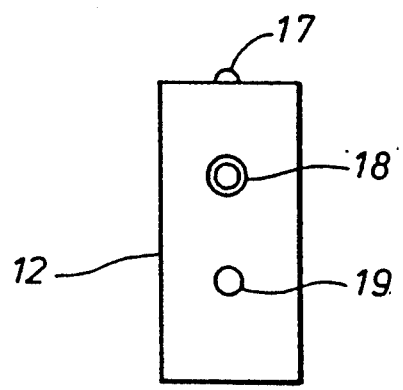
FIG. 5 is a front elevational view of a remote control unit of a camera according to the present invention.

As shown in FIG. 5, the remote control unit 12 is provided with an infrared light emitter 17, a remote control shutter button 18 corresponding to the shutter button of the camera, and a remote control zoom button 19 for actuating the powered zoom lens 2. The infrared light emitter 17 emits remote control signals when the remote control shutter button 18 or the remote control zoom button 19 is turned ON.

Figure 6:
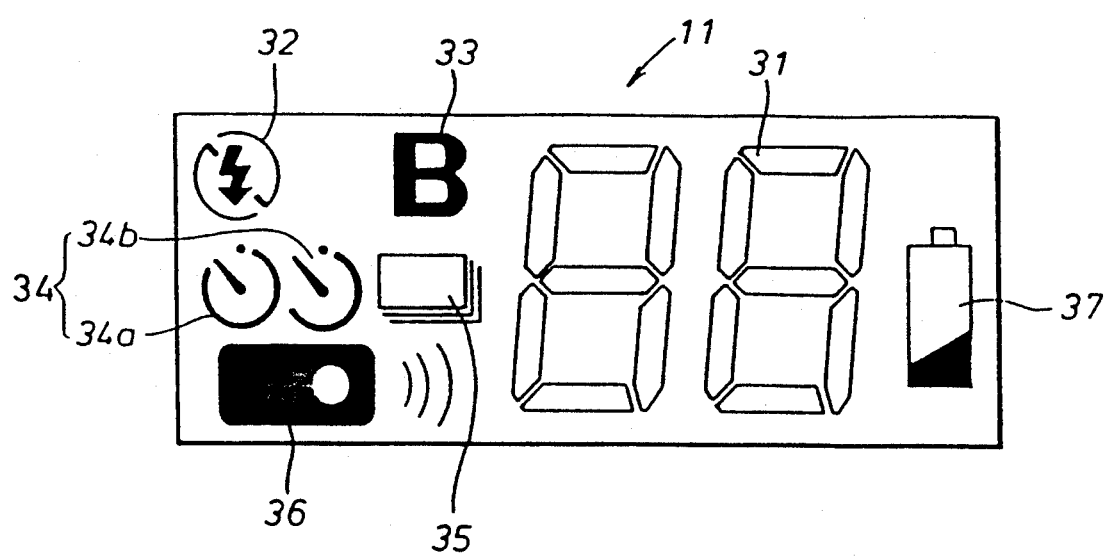
FIG. 6 is a front elevational view of an LCD window of a camera according to the present invention.

FIG. 6 shows an indication of the LCD window 11 which contains a first (center) indication portion 31 which indicates the counted number of taken or remaining frames of a film, a second indication portion 32 which indicates the state of the strobe, a third indication portion 33 which indicates the bulb function, a fourth indication portion 34 having a left portion 34a which indicates a regular self timer function and a right portion 34b which indicates a double self timer function in which a first picture is taken after the lapse of a predetermined period of time before a second picture is automatically taken 2-5 seconds later, a fifth indication portion 35 which indicates a continuous photographing mode in which pictures can be continuously taken when the shutter button 15 is depressed, a sixth indication portion 36 which indicates that the remote control signal can be received when the remote control unit 12 is detached from the camera body 1, and a seventh indication portion 37 which indicates the state of the battery, respectively. The indication portions 32 through 36 are provided on the left side of the center (first) indication portion 31. Only the seventh indication portion 37 is provided on the right side of the first indication portion 31.

Figure 7:
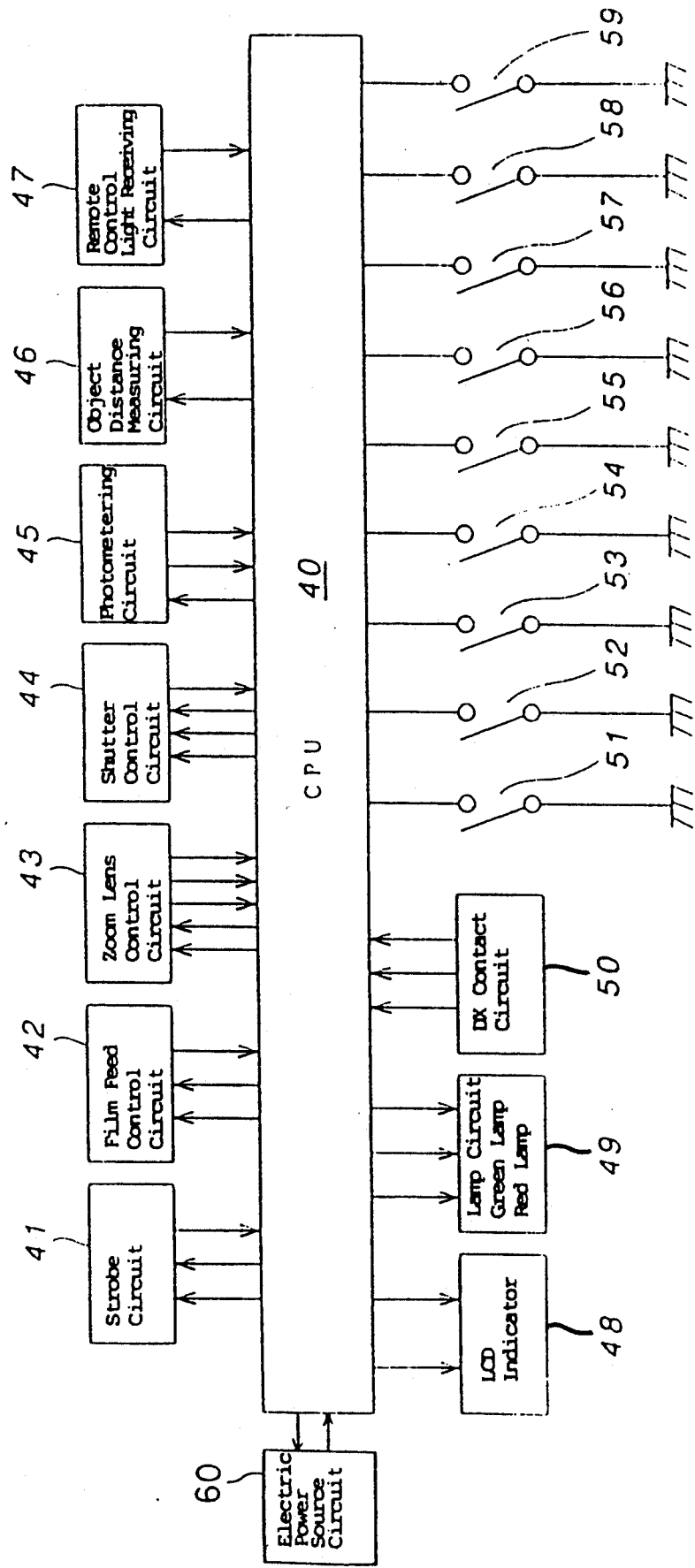
FIG. 7 is a block diagram of a control circuit of a camera according to the present invention.

FIG. 7 shows a simplified block diagram of a control circuit of the camera. To CPU 40 are connected a strobe circuit 41, a film feed control circuit 42, a zoom lens control circuit 43, a shutter control circuit 44, a photometering circuit 45, an object distance measuring circuit 46, a remote control signal receiving circuit 47, an LCD portion 48, a lamp circuit 49, and a DX contact circuit 50. The CPU 40 is also connected to a main switch 51 associated with the power button 16, a back cover switch 52, a photometering switch 53, a release switch. 54, a telephoto switch 55, a wide-angle switch 56, a mode switch 57, a drive switch 58, and a remote control switch 59. The switches other than the back cover switch 52, which is turned ON when the back cover 8 is closed, and the remote control switch 59, which is turned ON when the remote control unit 12 is detached from the camera body 1, are all momentary switches The photometering switch 53 is turned ON when the shutter button 15 is depressed half-way, and the release switch 54 is turned ON when the shutter button 15 is fully depressed.

Figure 8:
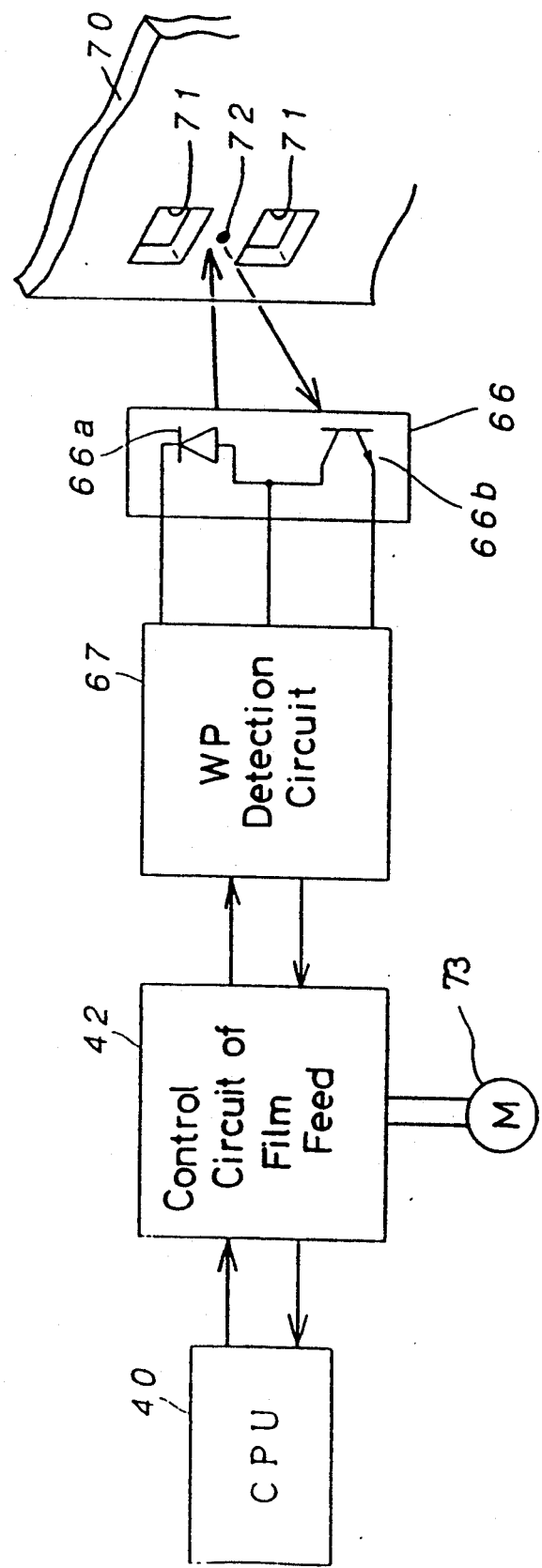
FIG. 8 is a block diagram of a WP detection circuit according to the present invention.
Figure 9A:
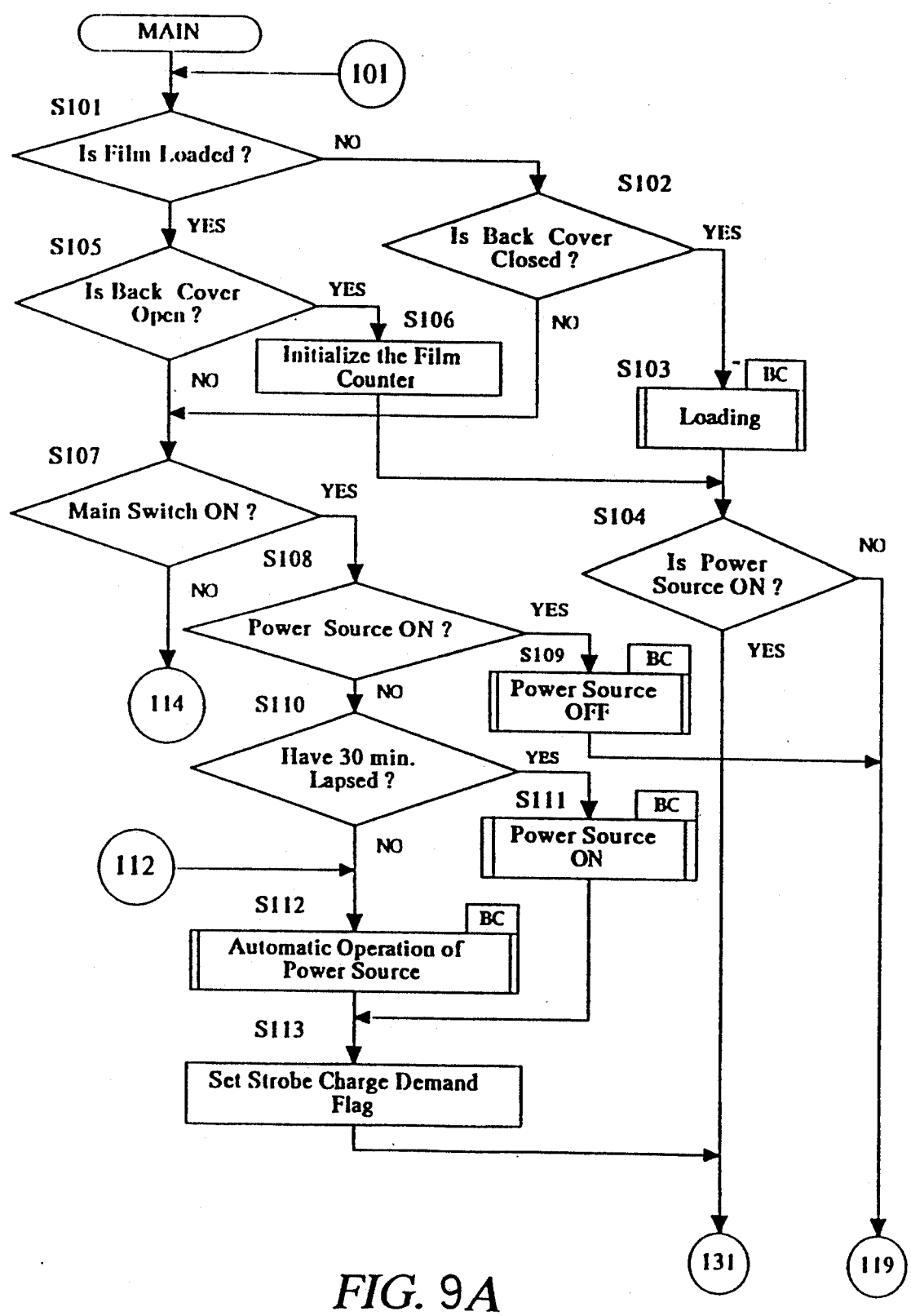
FIGS. 9A, 9B, 10A, 10B, 11A and 11B are flow charts of a main operation of a camera according to the present invention.
Figure 9B:
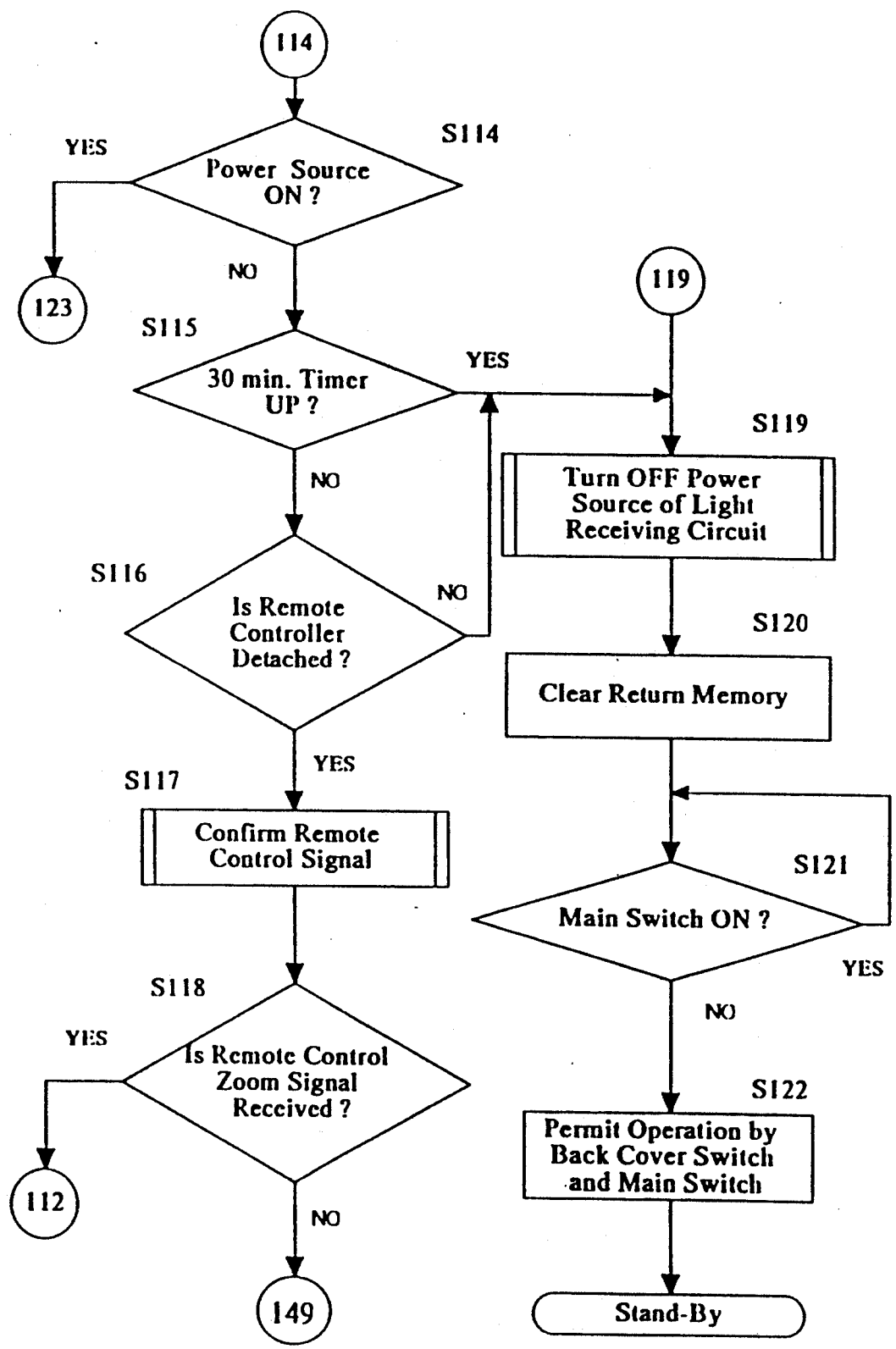
Figure 10A:
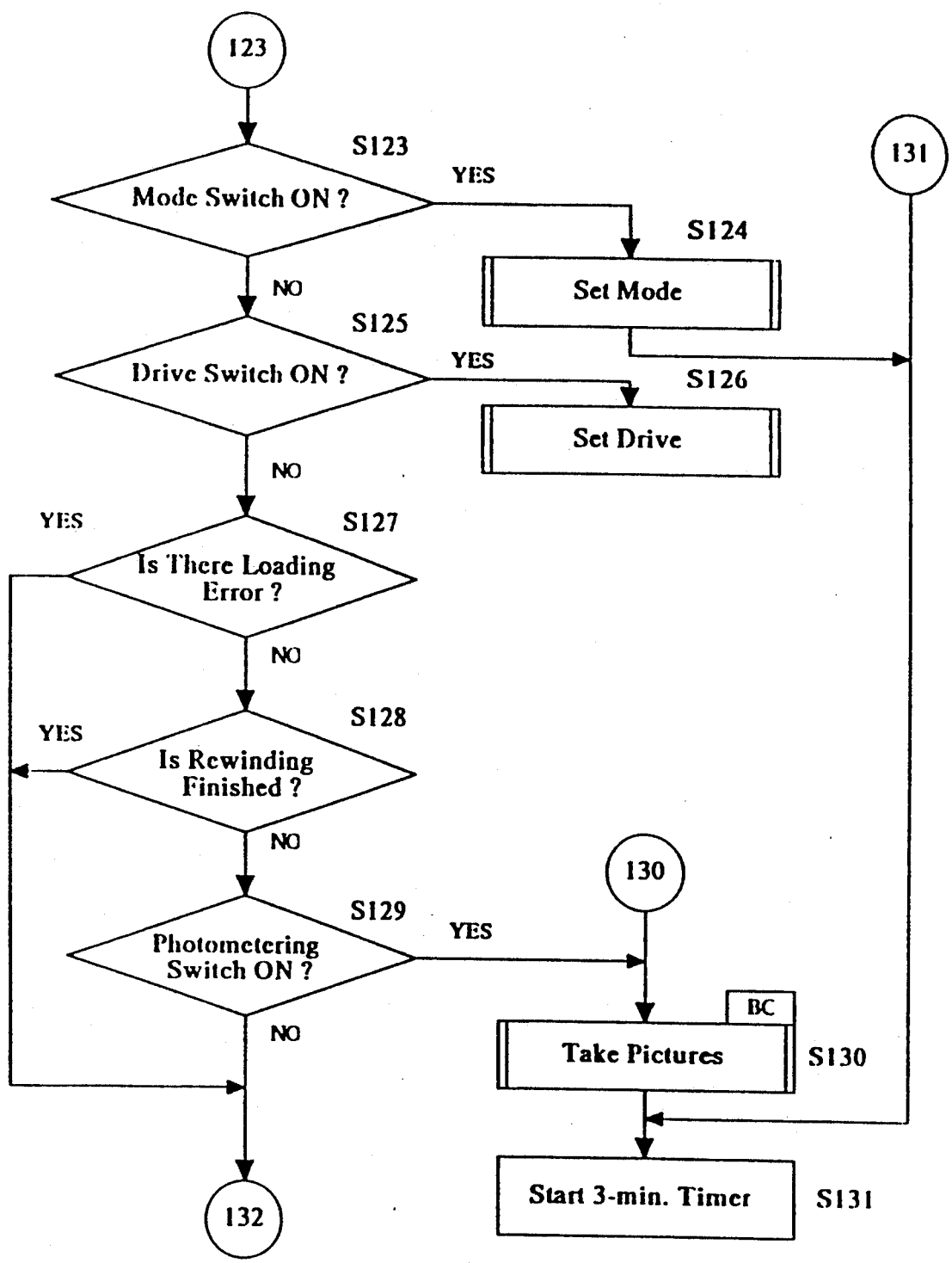
Figure 10B:
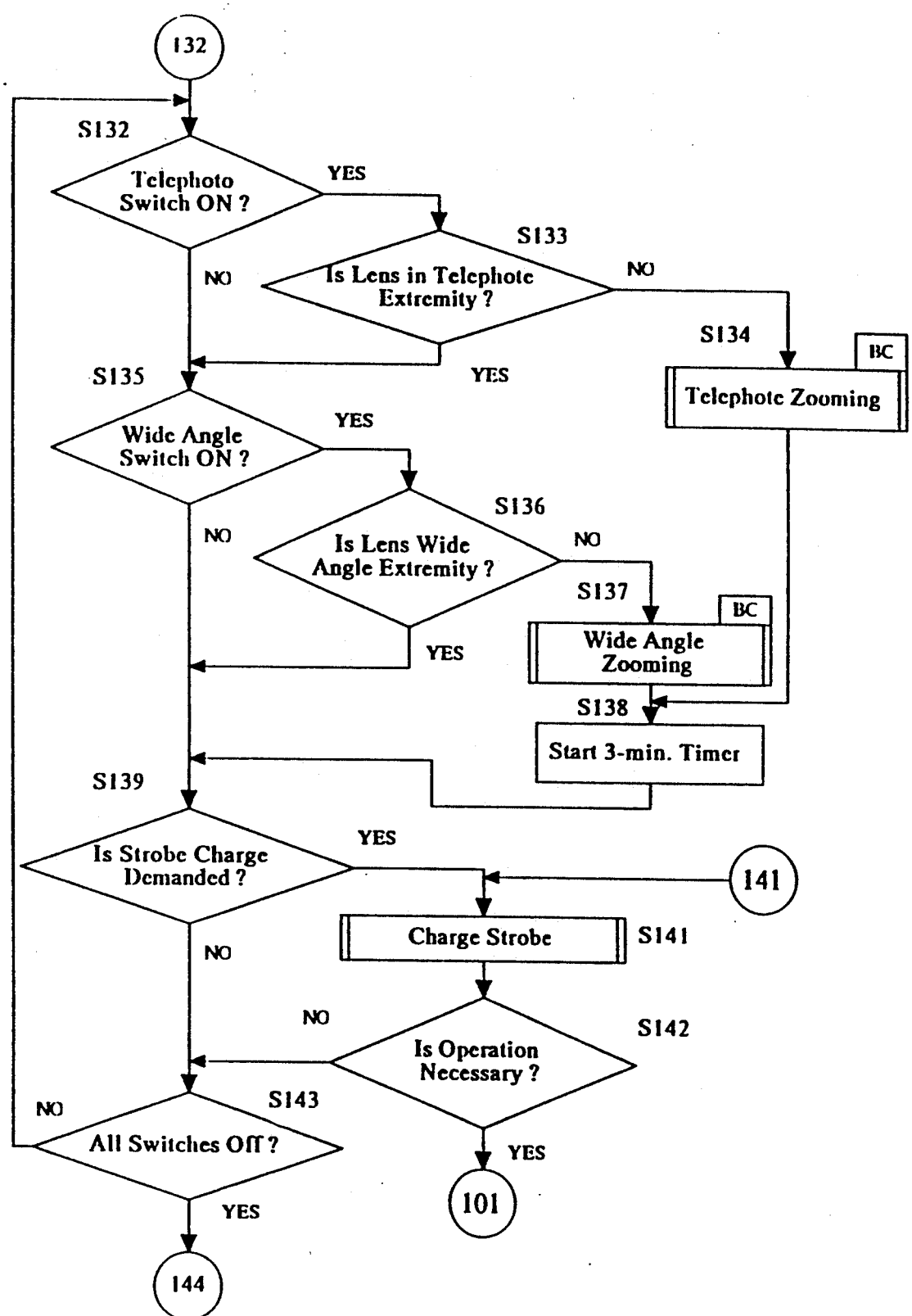
Figure 11A:
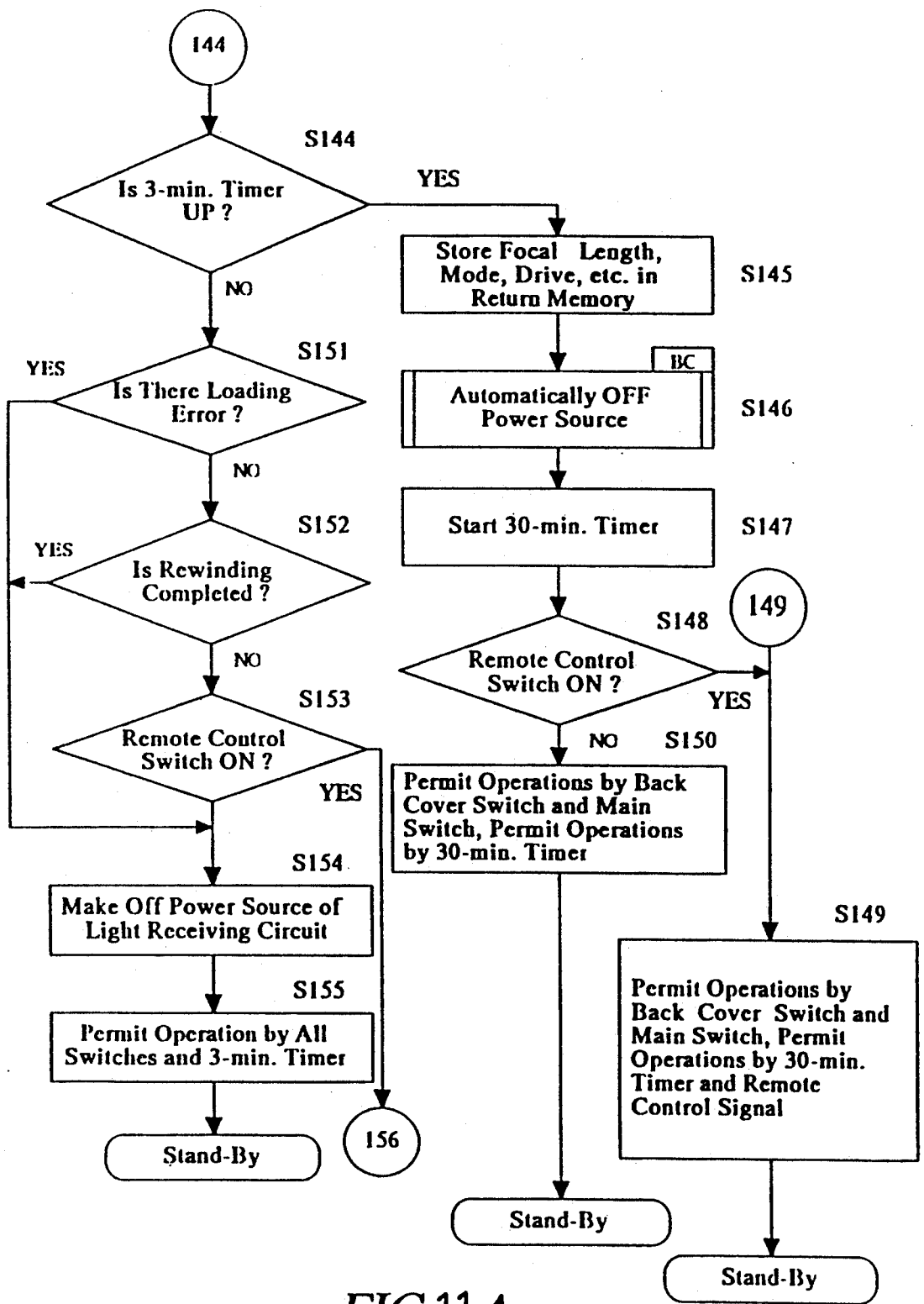
Figure 11B:
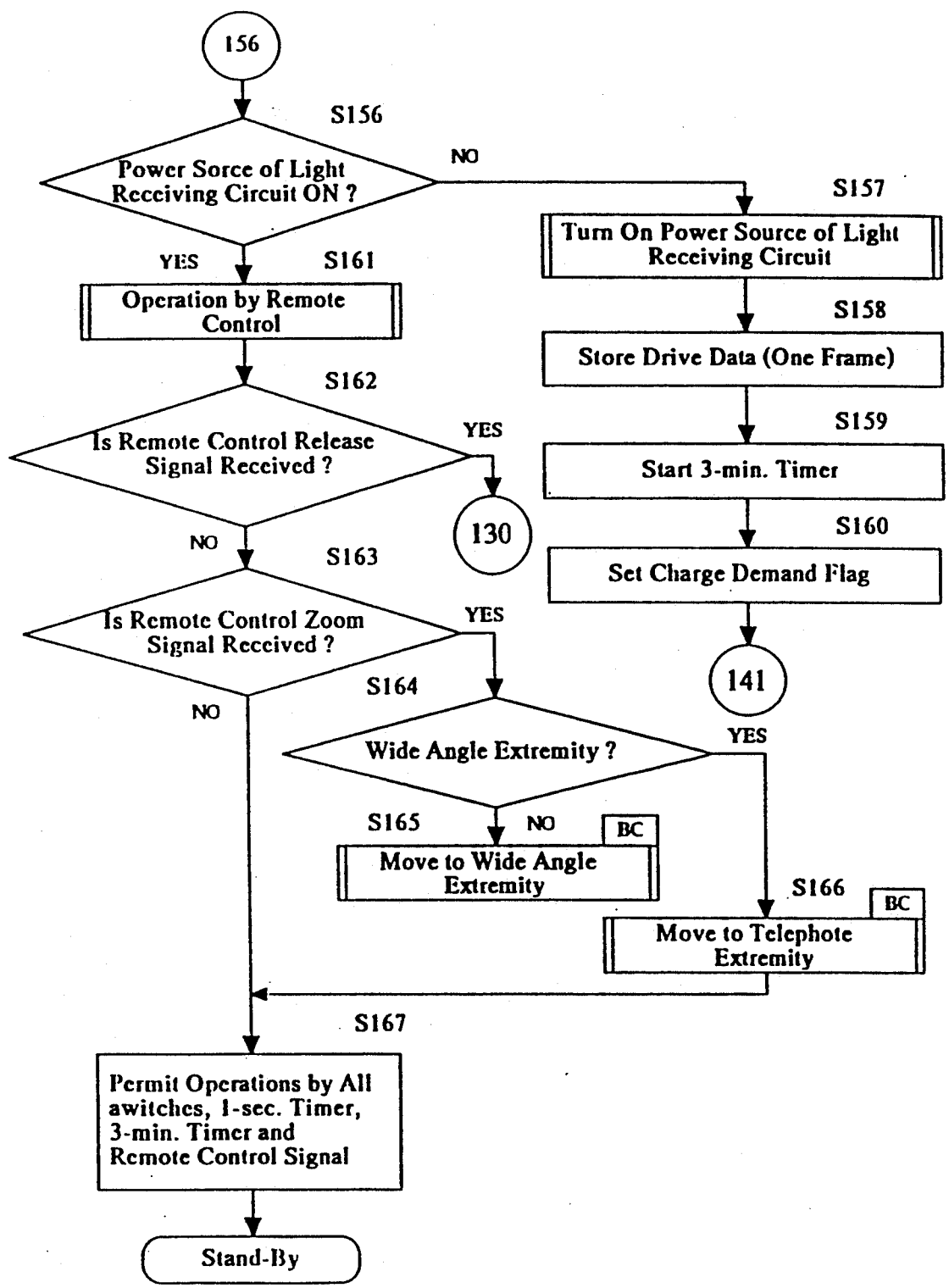

As shown in FIG. 8, the photoreflector 66 is made of an infrared light emitting diode 66a and a photodiode 66b. The photoreflector 66 sends an output signal to a WP (winding pulse) detecting circuit 67. The output signal corresponds to a difference between the quantity of light emitted from the LED 66a, transmitted through the perforations 71, reflected by the back cover and received by the photodiode 66b, and the light reflected by film portions 72 between the adjacent perforations 71 and received by the photodiode 66b.

Electric power is supplied to the CPU 40 from a power source circuit 60 which includes a battery, a constant voltage circuit and a clock signal generator, etc., as is well known.

CPU 40 generally controls all of the functions of the camera, such as control of the strobe device 41, etc., and further serves as a regulator and a switching circuit for controlling the power supply to the strobe device 41 and the remote control signal receiving circuit 47, etc., from the power source circuit 60. Namely, the CPU 40 supplies the respective elements with power when the power supply has not been effected (i.e., a power supply OFF state) and cuts the power supply to the elements when the power supply has been effected (i.e., a power supply ON state), every time the main switch 51 is actuated (i.e., turned ON).

If a switch is not actuated within a first predetermined period of time (e.g., three minutes) during the ON state of the power source, the movable zoom lens barrel 2b is retracted into the stationary zoom lens barrel 2a by the zoom lens control circuit 43 to protect the movable zoom lens barrel 2b, and the power source is turned OFF.

When the remote control unit 12 is detached from the camera body 1, power is supplied to the remote control signal receiving circuit 47, and the camera is changed to a stand-by state, in which a picture can be taken by the remote control.

If an operation is not performed within a second predetermined time (e.g., 30 minutes), in the stand-by position, the CPU 40 clears the held data (mode data, etc.) and is transferred to the power OFF state, in which no power is supplied to the remote control signal receiving circuit 47.

The following discussion will be directed to the operation of a remote control camera as constructed above (see FIGS. 9 through 14 and FIGS. 18 through 26).

To reduce power consumption, the CPU 40 is usually maintained in a stand-by position, in which no operation is effected (no clock signal is issued). The CPU 40 performs the main operation shown in FIGS. 9 through 14 and Figs. 18 through 26) through 13 when a predetermined start condition (requirement), depending on the state of the camera, is satisfied.

In the main operation, it is determined whether the film is loaded in the camera at step S101. If a film loading is not completed, whether the back cover 8 is closed (i.e., whether the back cover switch 52 is turned ON) is checked at step S102. If the back cover 8 is closed, a loading operation (i.e., cueing) is carried out at step S103. In the loading operation, whether the film is appropriately fed is checked in accordance with a film movement signal. If the film is appropriately advanced, the loading operation has been completed. Thereafter, it is checked whether the power source is in the ON state, to enable a picture to be taken, at step S104.

If the loading operation is completed at step S101, whether the back cover 8 is closed is checked at step S105. If the back cover 8 is open, the number of the film (counter) is initialized at step S106 and control proceeds to step S104. If the back cover 8 is closed at step S105, or if the back cover 8 is open at step S102, control proceeds to step S107 to check whether the main switch 51 (power button 16) is turned ON. If the main switch 51 is depressed at step S107 and if the power source has already been turned ON (step S108), the power source is switched OFF at step S109. If the power source is not turned ON, it is checked whether 30 minutes have elapsed after the power source is automatically turned OFF (steps S108, S110). If 30 minutes have elapsed, the camera is in an OFF state, in which it is responsive only to the back cover 8 or the power button 16. Thereafter, the power source is turned ON (step S111). If 30 minutes have not yet elapsed, the power source is automatically turned ON at step S112. After the operation at step S111 or S112 is completed, the strobe charge demand flag is set and control proceeds to step S131 (step S113).

In the illustrated embodiment, if no operation is effected within 3 minutes, the movable zoom lens barrel 2b is automatically retracted in the stationary lens barrel 2a to protect the movable lens barrel 2b. The focal length and focal mode of the powered zoom lens 2, and the set position of the driving operation are memorized. When the power button 16 is depressed within 30 minutes after the automatic retraction of the movable lens barrel, the camera is returned to an initial position before the automatic retraction.

If main switch 51 is not actuated (not ON) at step S107, control proceeds to step S114. If the power source is in the ON state, control proceeds to steps S123 and S125 to check whether the mode switch 57 and the drive switch 58 are switched ON, respectively. If the mode switch 57 is switched ON, the mode setting operation, to switch the set position of the strobe, and bulb function is performed (step S124). If the drive switch 58 is turned ON, the drive setting operation is performed to switch the self-timer, double self-timer and continuous taking function (step S126).

If the power source is not turned ON within 30 minutes after the power source has been automatically switched OFF at step S114, control proceeds to steps S115 and S116 to check whether the set time of the the 30-minute timer is up, and whether or not the remote control unit 12 is attached to the camera body. If the set time of the the 30-minute timer is up and the remote control unit is attached to the camera body 1, control proceeds to step S119 to turn OFF the power source of the light receiving circuit 47 Thereafter, the memory which stores the mode, drive, focal length data, etc., is cleared (step S120). Thereafter, whether the main switch 51 is turned OFF is checked (step S121). If the main switch 51 is turned OFF, control proceeds to step S122, in which the camera can be actuated only when the back cover switch 52 is changed and the main switch 51 is closed.

Note that if the power source is OFF at step S104, or the power source is turned OFF at step S109, the operations at steps S119 through S122 are performed.

If the set time of the 30-minute timer has not expired, and the remote control unit 12 is detached from the camera at steps S115 and S116, respectively, the remote control signal confirming operation is effected (step S117). Thereafter, whether the remote control zoom switch 19 is actuated is checked at step S118. If no remote control zoom signal is received at step S118, control proceeds to step S149, in which the operation can be performed only when the back cover switch 52 is switched, the main switch 51 is closed, the remote control switch 51 is switched, the set time of the 30-minute timer is up, or the remote control signal is input. If the remote control zoom signal is received at step S118, control proceeds to step S112, at which step the power source is automatically turned ON.

If both the mode switch 57 and the drive switch 58 are not actuated at steps S123 and S125, the taking operation is effected (step S130), as long as there is no loading error (step S127). the film rewinding operation is completed (step S128), and the photometering switch 53 is turned ON (i.e., the shutter button is slightly depressed) (step S129). After the taking operation has been completed, the 3-minute timer is reset to start the same (step S131). If the back cover 8 is closed at step S102 and the power source is turned ON after the loading operation is finished (steps S103 and S104), or the strobe charge demand flag is set at step S113 after the power source is turned ON at step S112, or the mode setting operation or the drive setting operation is effected at steps S123 and S124 or steps S125 and S126, the 3-minute timer is reset (step S131).

If a loading error is detected at step S127, or completion of the film rewinding is detected at step S128, or the photometering switch 53 is turned OFF at step S129, or the taking operation is finished and the 3-minute timer is reset to start at steps S130 and S131, whether the telephoto switch 55 and the wide angle switch 56 are turned ON is checked at steps S132 and S135.

If the telephoto switch 55 is turned ON at step S132, whether the powered zoom lens 3 is in the telephoto extremity is checked at step S133. If the powered zoom lens 3 is not in the telephoto extremity, the zoom lens is moved to the telephoto extremity (step S134). Similarly, if the wide angle switch 56 is ON, whether or not the powered zoom lens 3 is in the wide angle extremity is checked (steps S135 and S136). If the powered zoom lens 3 is not in the wide angle extremity, the zoom lens is moved to the wide angle extremity (step S137). When the powered zoom lens control, as mentioned above, is carried out, the minute timer is reset (step S138).

Thereafter, whether the strobe charging is demanded is checked by the strobe charge demand flag at step S139. The strobe charge demand flag is set when the remote control unit 12 is detached from the camera body 1, the power source is turned ON, or the strobe light is emitted. If the strobe charge demand flag is set at step S139, control proceeds to step S141 to charge the strobe. During the strobe charge operation, in which a capacitor (not shown) is charged, if any switch which requires an operation is actuated, the charging is interrupted, and control is returned to step S101 of the main flow from step S142. If no operation is required at step S142, the charging continues until it is completed. When the strobe charge is finished, the strobe charge demand flag is Cleared, and control proceeds to step S143.

At step S143, if any momentary switch is actuated, control is returned to step S132. If no switch is actuated, whether the set time of the 3-minute timer is up is checked (step S144). If the set time is up, the focal length, mode, state of drive data, etc. are stored in the memory (steps S144 and S145). Thereafter, the power source is automatically turned OFF, and the 30-minute timer is started (steps S146 and S147).

After that, whether the remote control unit 12 is detached from the camera body 1 is checked (step S148). If the remote control unit 12 is detached from the camera body 1, control proceeds to step S149. Conversely, if the remote control unit 12 is attached to the camera body 1, control proceeds to step S150, in which an operation can be effected only when the back cover switch 52 is turned ON, the main switch 51 is closed, or the set time of the 30-minute timer is up.

If the set time of the 3-minute timer is not up at step S144, whether there is a loading error and whether the film operation is finished (steps S151 and S152) are checked. If there is a loading error or the film rewinding operation is finished, the power supply to the light receiving circuit is stopped (steps S151~S154). Thereafter, control proceeds to step S155, in which an operation can be effected only when the back cover switch 52 or the remote control switch 59 is turned ON, the momentary switch is closed, or the set time of the 3-minute timer is up.

If there is no loading error and if the film rewinding operation is not finished, control proceeds to step S153 to check whether the remote control unit 12 is detached from the camera body 1 (steps S151~S153). If the remote control unit 12 is detached from the camera body 12, whether the power source of the light receiving circuit 47 is turned ON is checked (step S156). If the remote control unit 12 is attached to the camera body 12, the power supply to the light receiving circuit 47 is stopped (step S154). Control then proceeds to step S155. If the power source of the light receiving circuit 47 is turned ON at step S156, the remote control operation is carried out at step S161. Thereafter, the self lamp 7; which indicates that the remote control operation can be carried out, blinks at 1 second intervals, and the camera stands-by for receipt of the remote control signal.

If the power source of the light receiving circuit 47 is turned OFF when the remote control unit 12 is detached from the camera body 1, the power source of the light receiving circuit 47 is turned ON. The drive memory is then set to "0" (steps S157 and S158). Namely, the normal mode in which a picture is taken for each frame is compulsively set. Thereafter, the 3-minute timer is reset, the charge demand flag is set, and control is returned to step S141 (steps S159, S160 and S141).

If the remote control release signal is received at step S162, control proceeds to step S130 (picture taking operation). If the remote control release signal is not received at step S162, and if the remote control zoom signal is received at step S163, the zoom lens barrel 2b is toggle-moved toward the telephoto extremity or wide angle extremity every time the remote control zoom signal is received (steps S164~S166). If no zoom signal is received, control proceeds to step S167, in which an operation can be effected only when the back cover switch 52 or the remote control switch 59 is switched, the set time of the 1-second or 3-minute timer is up, or the remote control signal is input. In the illustrated embodiment, although only the wide angle extremity or the telephoto extremity is realized in accordance with the remote control signal, it is possible to provide three, or more than three zoom stages (zoom positions).

Figure 12:
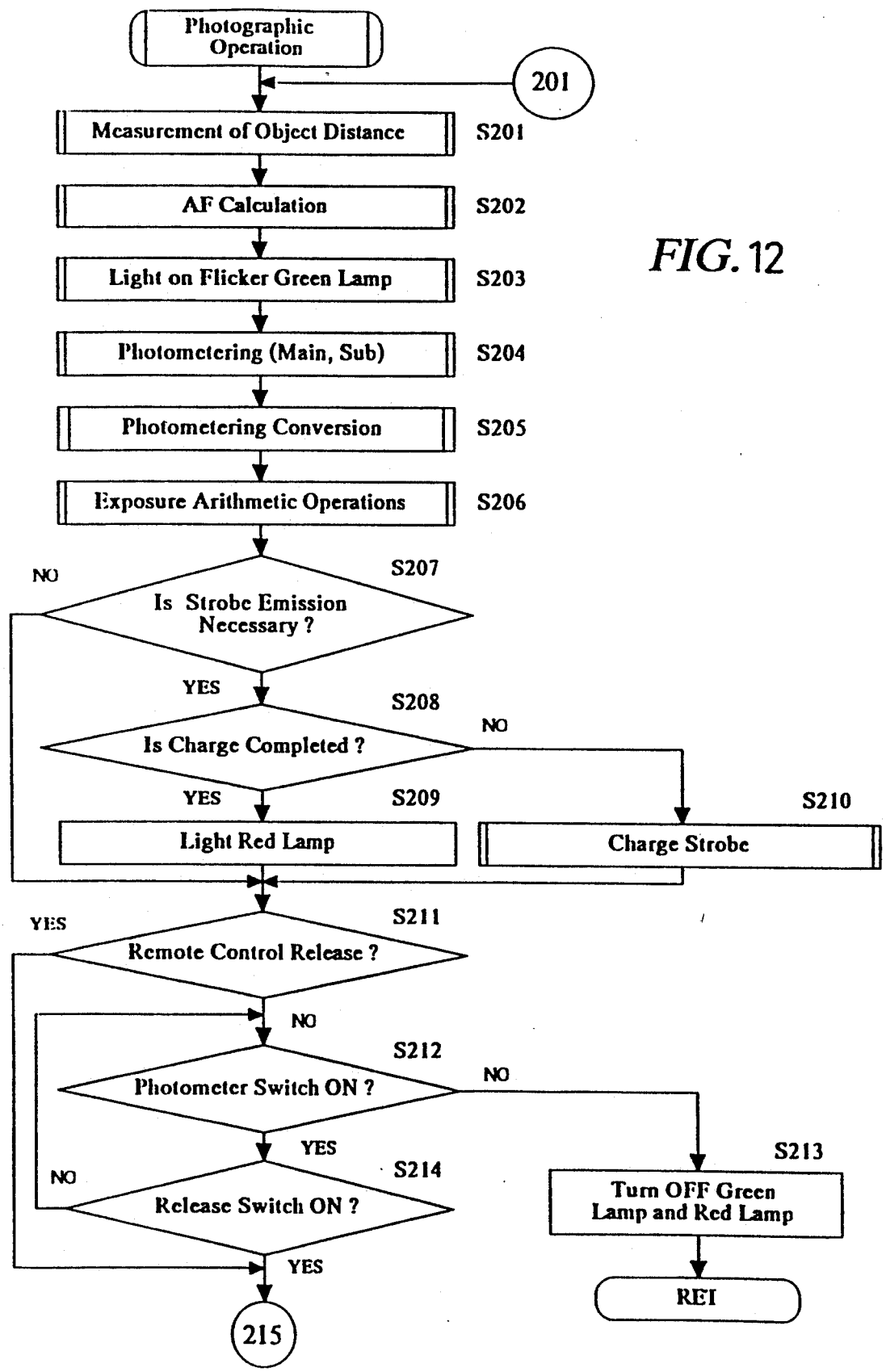
FIGS. 12, 13, and 14 are flow charts of a taking operation (photographic operation) of a camera according to the present invention.
Figure 13:
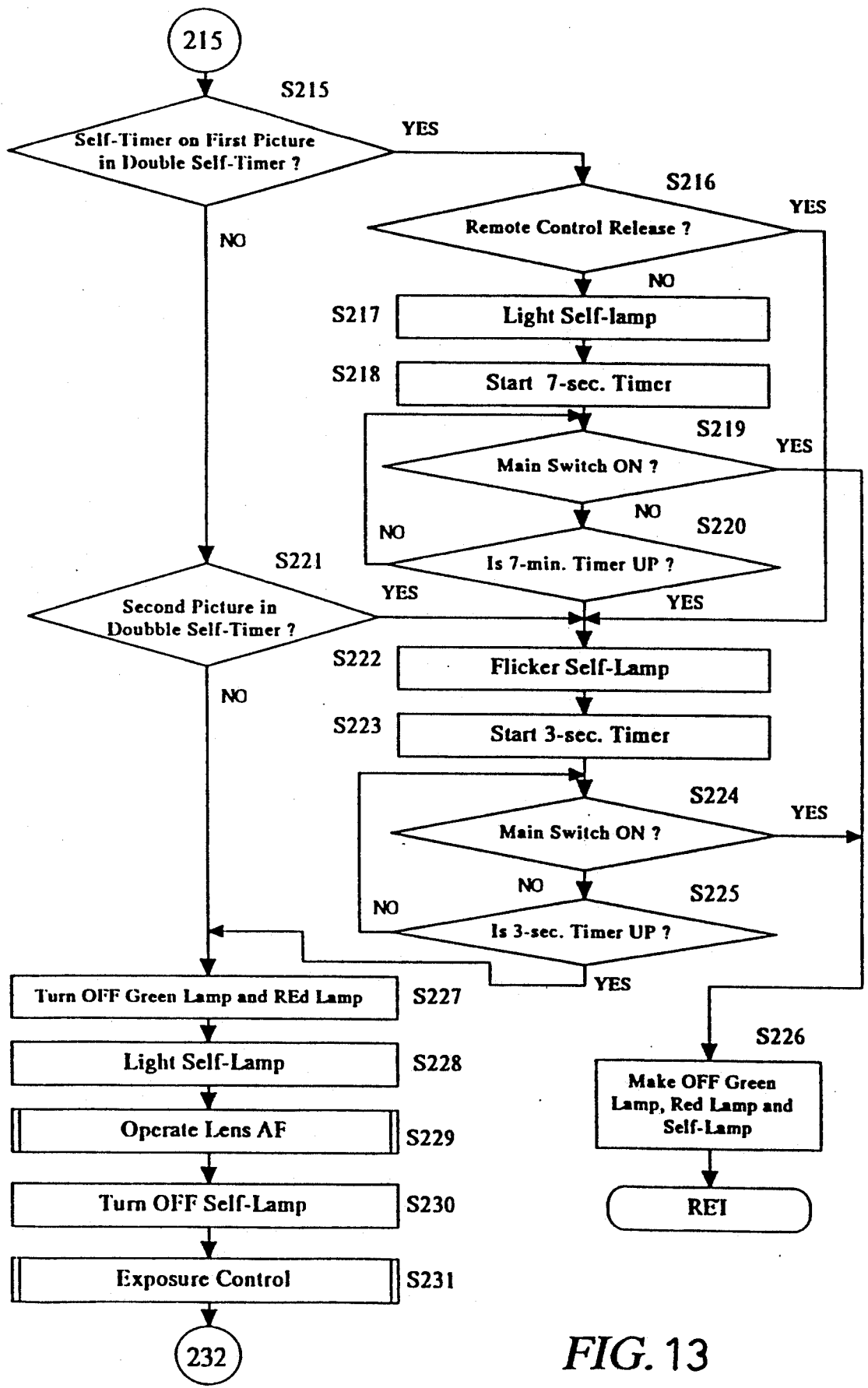
Figure 14:
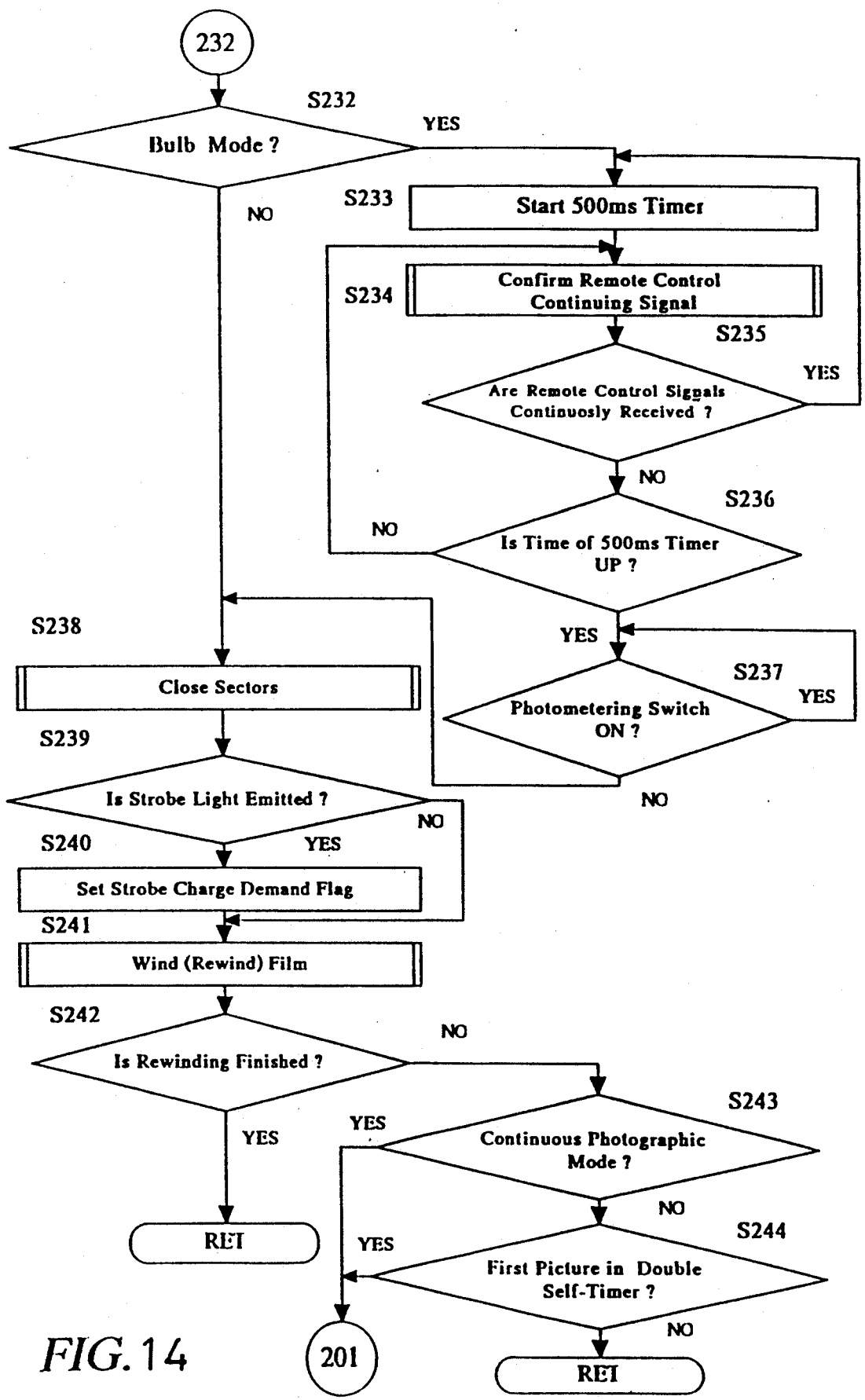

FIGS. 12 through 14 show the picture taking operation (photographic operation) at step S130.

In the picture taking operation, an AF (Automatic Focusing) arithmetic operation, measurement of object distance, operation of the green lamp, measurement of object brightness, photometering conversion, and exposure arithmetic operations are performed (steps S201~S206). Thereafter, control proceeds to step S207 to check whether the strobe emission is necessary. If the strobe light is not necessary, control proceeds to step S211. Conversely, if the strobe light is necessary, whether the strobe charging is completed is checked at step S208. If the strobe is charged, the red lamp 23 is illuminated. If the strobe is not sufficiently charged, the strobe charging operation is continued (steps S208~S210). During the charging operation, the red lamp 23 blinks. Upon completion of the charging operation, the red lamp 23 is illuminated. In the case where the remote control is not released, when the photometering switch 53 is turned OFF, the charging operation is interrupted.

If the remote control release signal is received at step S211 to enter a sub-routine shown in FIGS. 13 and 14, control proceeds to step S215. If control enters the sub-routine by the operation of the photometering switch 53, the release switch 54 is turned ON while the photometering switch 53 is ON to send control to step S215 (steps S212 and S214). If the photometering switch 53 is turned OFF, the red lamp 23 and the green lamp 22 are turned OFF, and control is returned to the main flow (steps S212 and S213).

At step S215, whether the self-timer function or the double self-timer function is selected is checked. If the self-timer function or the double self-timer function is selected, the self-timer operation at steps S216~S226 is carried out. Namely, if the normal self-timer function is selected, or a picture of a first frame in the double self-timer function is to be taken, whether or not the mode is the remote control release mode is checked (step S216). In the case of the remote control release operation, the self-timer lamp 7 blinks, and the 3-second timer is started (steps S222, S223). When the set time of the 3-second timer has elapsed, the red lamp 23 and the green lamp 22 are turned OFF (steps S225, S227). Thereafter, the self-timer lamp 7 is illuminated at step S228. The automatic focusing operation of the lens is then carried out (step S229). Thereafter, the self-timer lamp 7 is turned OFF, and the exposure control is effected (steps S230, S231).

If the operation is not the remote control release operation, the self-timer lamp 7 is lit and the 7-second timer is started (steps S216, S217 and S218). If the main switch 51 is not actuated before the set time of the 7-second timer is up at step S219, control proceeds to step S222 to blink the self-timer lamp 7. Thereafter, the 3-second timer starts (step S223). If main switch 51 is not actuated before the set time of the 3-second timer is up, control proceeds to step S227 to perform the operations at steps S227 through S231.

If the main switch 51 is turned ON before the set times of the 3-second timer and the 7-second timer are up, control proceeds to step S226 to cancel the self-timer function (steps S219, S226 or S224, S226).

If the normal self-timer function is not selected or if no picture of a first frame in the double self-timer function is taken, whether a picture of a second frame in the double self-timer function is to be taken is checked at Step S221. If the second picture is to be taken, the operations at steps S222 through S226 are performed to take the second picture with a delay time of 3 seconds (steps S215, S221 and S222).

If the picture is not the second one in the double timer function, the operations at steps S227 through S231 are directly performed (steps S221, S227~S231).

As can be understood from the above discussion, if a picture is taken with the normal self-timer function or a first picture is taken with the double self-timer function from the camera body side, the photographic operation is carried out when both the 3-second timer and the 7-second timer are set, so that a total delay time of 10 seconds is set. On the other hand, in the case of the remote control release operation, when the exposure mode is set to be a self-timer mode, or in the case where a second picture in the double self-timer function is to be taken, a delay time of 3 seconds is set.

In the first 7 seconds of the above-mentioned delay time, of 10 seconds, the self-timer lamp 7 is continuously lit, but, in the remaining 3 seconds, or the delay time for the second picture in the double self timer function, the self-timer lamp 7 blinks. Furthermore, if the main switch 51 is actuated during the self-timer function, the self-timer operation is interrupted, and the green lamp 22, the red lamp 23, and the self-timer lamp 7 are all turned OFF, so that control is returned to the main flow (steps S224, S226).

If, the self-timer function is not selected or when the self-timer function is appropriately completed, the green lamp 22 and the red lamp 23 are turned OFF, and the self-timer lamp 7 is maintained ON, and the automatic focusing operation of the lens is carried out (steps S215, S221, S227~S229). After that, the self-timer lamp 7 is turned OFF. Thereafter, the exposure control operation is carried out (steps S230, S231). In the exposure control operation, the shutter blades (sectors) are opened to a diaphragm value that is calculated at step S206, and no operation is effected for the exposure time calculated. When the exposure time lapses, control proceeds to step S232.

After the exposure control is effected at step S231, whether the bulb mode is selected is checked (step S232). If the bulb mode is not selected, the shutter blades (sectors) are closed to finish the photographic operation (step S238). Thereafter, whether strobe light is emitted is checked (step S239). If strobe light is emitted, the strobe charge demand flag is set. Thereafter, the film is wound by one frame (steps S240, S241). If no strobe light is emitted, the film is wound by one frame without setting the strobe charge demand flag. When the end of the film is detected, the automatic film rewinding operation is effected (S241).

If the completion of the film rewinding operation is detected at step S242, control is returned to the main flow. If the film rewinding operation is not completed at step S242, control proceeds to step S243 to detect the continuous photographing mode. If the photographing mode is a continuous shot mode, control is returned to step S201. If the photographing mode is not the continuous shot mode, control proceeds to step S244 to check whether the first picture in the double self-timer function is to be taken. If the first picture in the double self-timer function is to be taken, control is returned to step S201. If the picture to be taken is not the first picture, control returns to the main flow.

If the bulb mode is selected at step S232, control proceeds to step S233 to start a 500 msec timer and confirm that the remote control signals issued at an interval within 50 msec from the remote control unit 12 are being continuously received (steps S234 and S235). As long as the remote control signals are continuously received, the shutter blades (sectors) remain in an open position. The shutter blades are also maintained in the open position also while the shutter release button (photometering switch 53) is depressed. If the set time of the 500 msec timer is up and if the photometering switch 53 is turned OFF, the shutter blades are closed (steps S236, S237 and S238).

Alternatively, in the bulb mode, it is possible to open and close the shutter blades, for example, in response to the first remote control release signal and the second remote control release signal, respectively.

In a camera of the present invention, upon operating the motor or the like with a high power (e.g. electric current), for example, in steps S103, S109, S111, S112, S130, S134, S137, S146, S165, and S166, etc., the charge state of the battery is determined as shown by blocks labelled "BC" in FIGS. 9 through 14 and FIG. 18 before the respective operations are performed.

Figure 15:
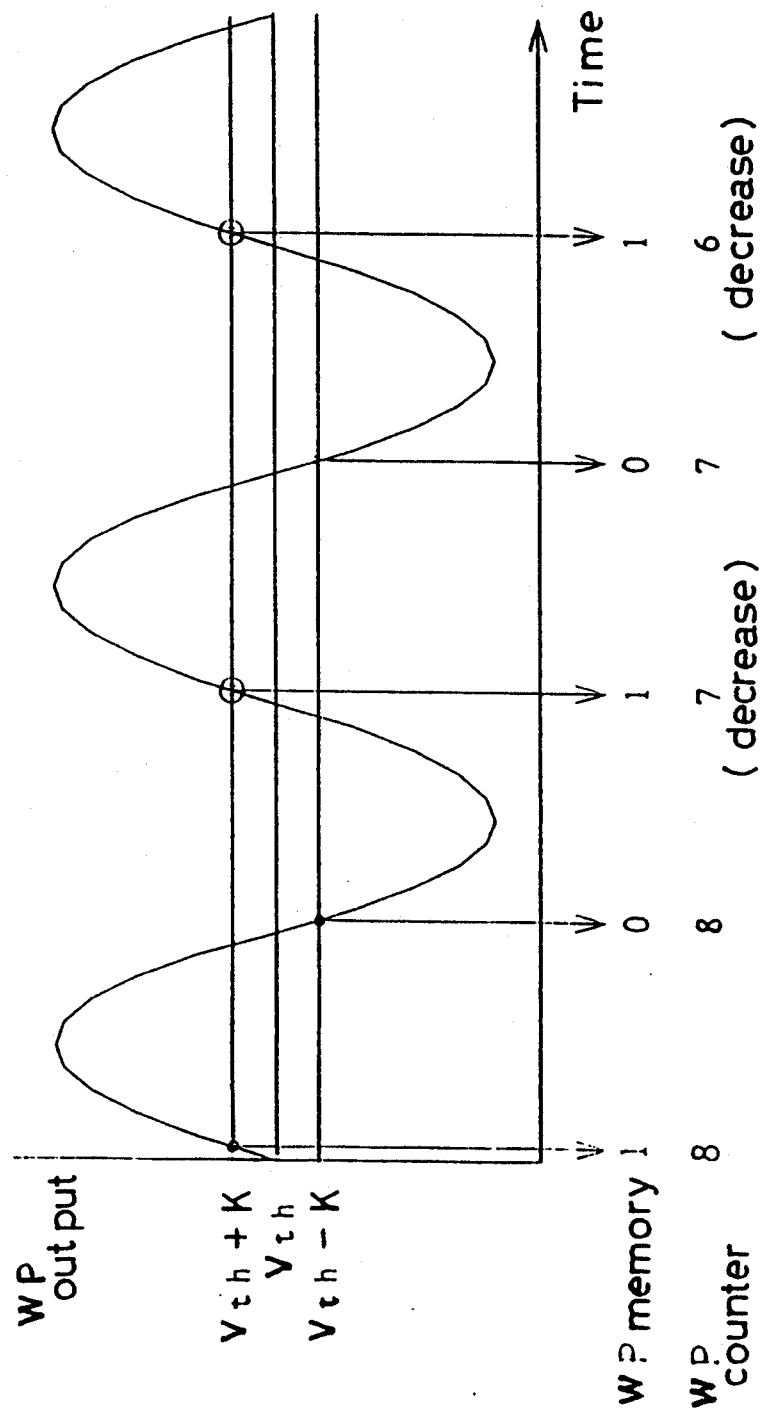
FIG. 15 is a diagram showing the principle of a WP detection in a camera according to the present invention.

FIG. 15 shows a diagram to explain how the number of perforations 71 of the film 70 is counted based on the output signal of the photoreflector 66 (i.e., WP output) in the WP detecting circuit 67. The maximum and minimum values of the output of the photoreflector 66 correspond to the portions 72 of the film 70, between the adjacent perforations 71, and the centers of the perforations 71, respectively.

Although it is possible to count the pulse number every time the output curve of the photoreflector 66 intersects level Vth, representing an average value of the output, points at which the output curve intersects different threshold values are detected. Specifically, these values are (Vth−K) and (Vth+K), in the descending portion and rising portion of the output curve, respectively. In this case, as shown in the illustrated embodiment, the pulse number is counted every time the output curve intersects the threshold values (Vth+K) in the rising portion of the output curve.

Thus, a hysteresis is provided to the detection circuit to prevent possible incorrect counting due to noise or other external interference.

Figure 16:
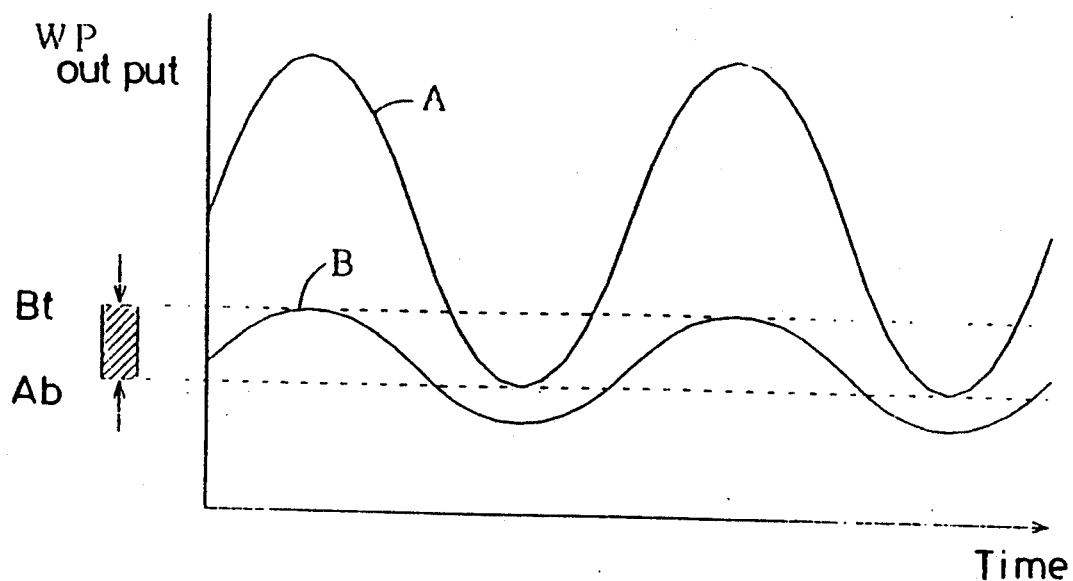
FIG. 16 is a diagram showing the WP detection being effected based on a threshold value set according to the prior art.
Figure 17:
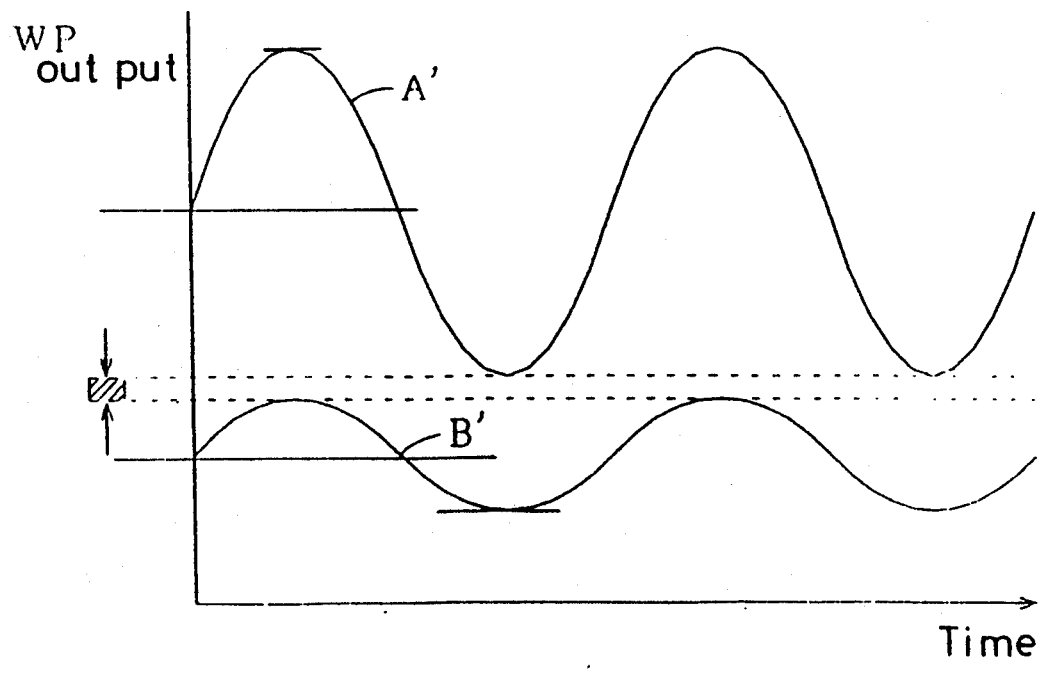
FIG. 17 is a diagram showing the WP detection not being effected based on a threshold value set according to the prior art.

FIGS. 16 and 17 show diagrams when little or no WP output can be detected due to fluctuation of the WP output signals. In FIG. 16, if a fluctuation of the signals for various films are within a range defined by the overlapping portion of the output curves A and B, the WP output can be detected by setting the threshold level within a range between Bt and Ab. However, if the WP output fluctuates outside of this range, as shown at output curves A' and B' in FIG. 17, a threshold level cannot be set to count the WP number (winding pulse number). To avoid this situation, according to the present invention, the threshold level is set with reference to the mean value Vth of the WP outputs, regardless of the fluctuation of the WP outputs. Accordingly, the number of the perforations of film can be precisely detected, even if there is a large fluctuation of the WP output, as shown in FIG. 15.

Figure 18:
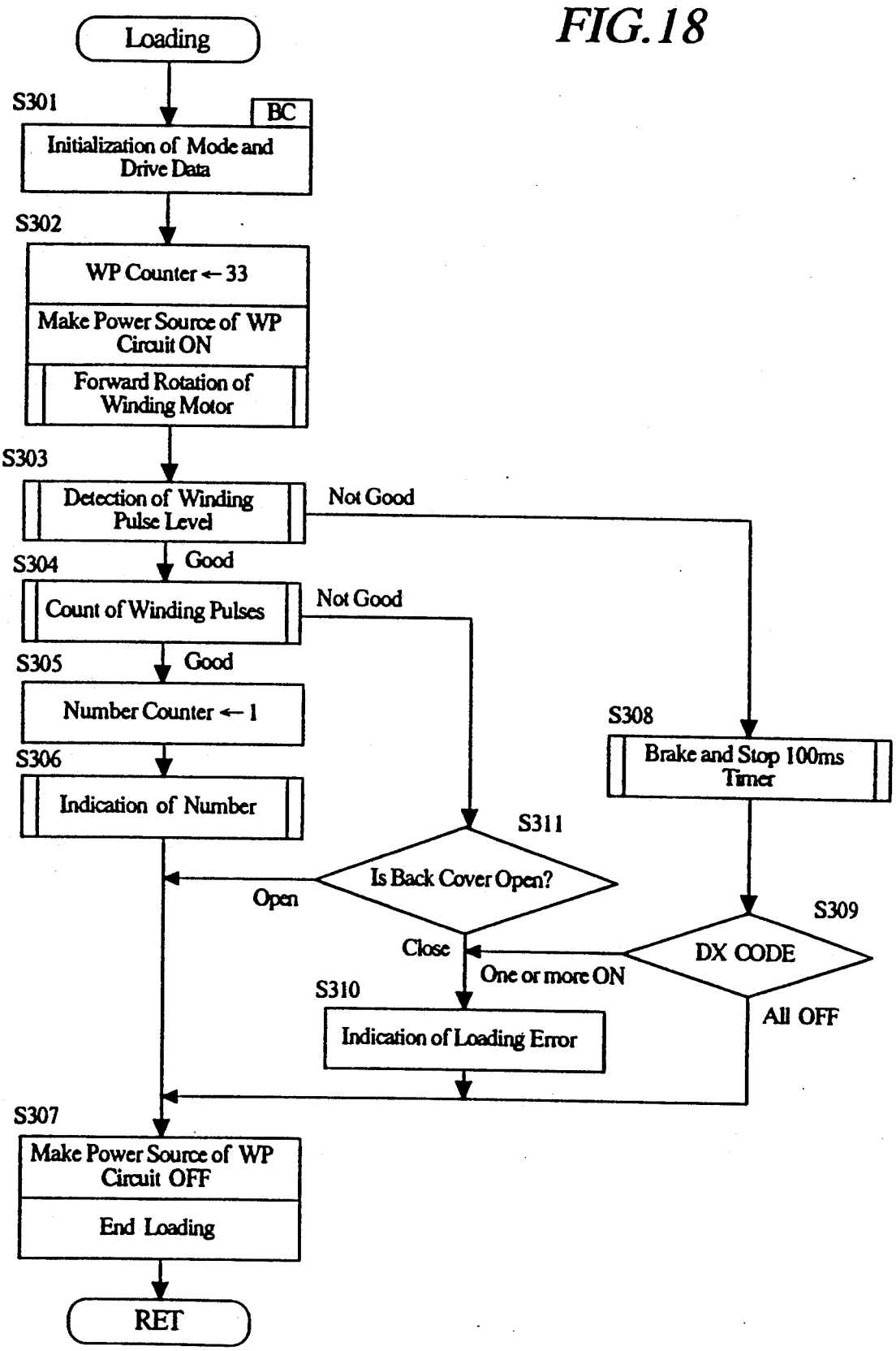
FIG. 18 is a flow chart of a film loading operation of a camera according to the present invention.

FIG. 18 illustrates a flow chart of a loading operation at step S103. In FIG. 18, mode data and drive data are 0 initialized at step S301. Thereafter, the value "33" is stored in the winding pulse counter (WP counter) in the CPU 40, electric power is supplied to the photoreflector 66 and the WP detecting circuit 67, and the winding motor 73 is rotated in a forward direction (step S302). To minimize power consumption, power is not continuously supplied to the photoreflector 66 and the WP detecting circuit 67. To this end, the power source is turned ON immediately before the winding motor 73 operates, and is turned OFF upon completion of the film feeding operation.

Therefore, the threshold value setting operation is effected to detect the WP, as will be described below. If a predetermined WP is obtained, the WP is counted, as will be described below (steps S303 and S304). The value "1" is set in the number counter, so that the number "1", which represents the number of frames, is indicated in the film counter portion 31 (step S306). Consequently, a picture can be taken in the first frame. Thereafter, electrical power to the photoreflector 66 and the WP detecting circuit 67 are terminated, and the film loading operation is completed (step S307). Control is then returned.

If a determination is made in step S304 that the winding pulse count is not good, control proceeds to step S311 to determine whether the back cover 8 of the camera body 1 is open. If the back cover is open, control proceeds to step S307, discussed above. However, if the back cover 8 of the camera body 1 is closed, control proceeds to step S310 to indicate a film loading error.

If the obtained WP level is abnormal (at step S303), the winding motor 73 is braked and stopped (step S308). Thereafter, at step S309, the DX codes are determined based on the signals from the DX pins 62. If all the DX pins are OFF, the patrone is not loaded. Control then jumps to step S307 to finish the loading operation. Conversely, if any one of the DX pins 62 is ON, loading cannot be completed in spite of the fact that the film is charged. Accordingly, control proceeds to step S310 to indicate a loading error. Thereafter, control proceeds to step S307.

Figure 19:
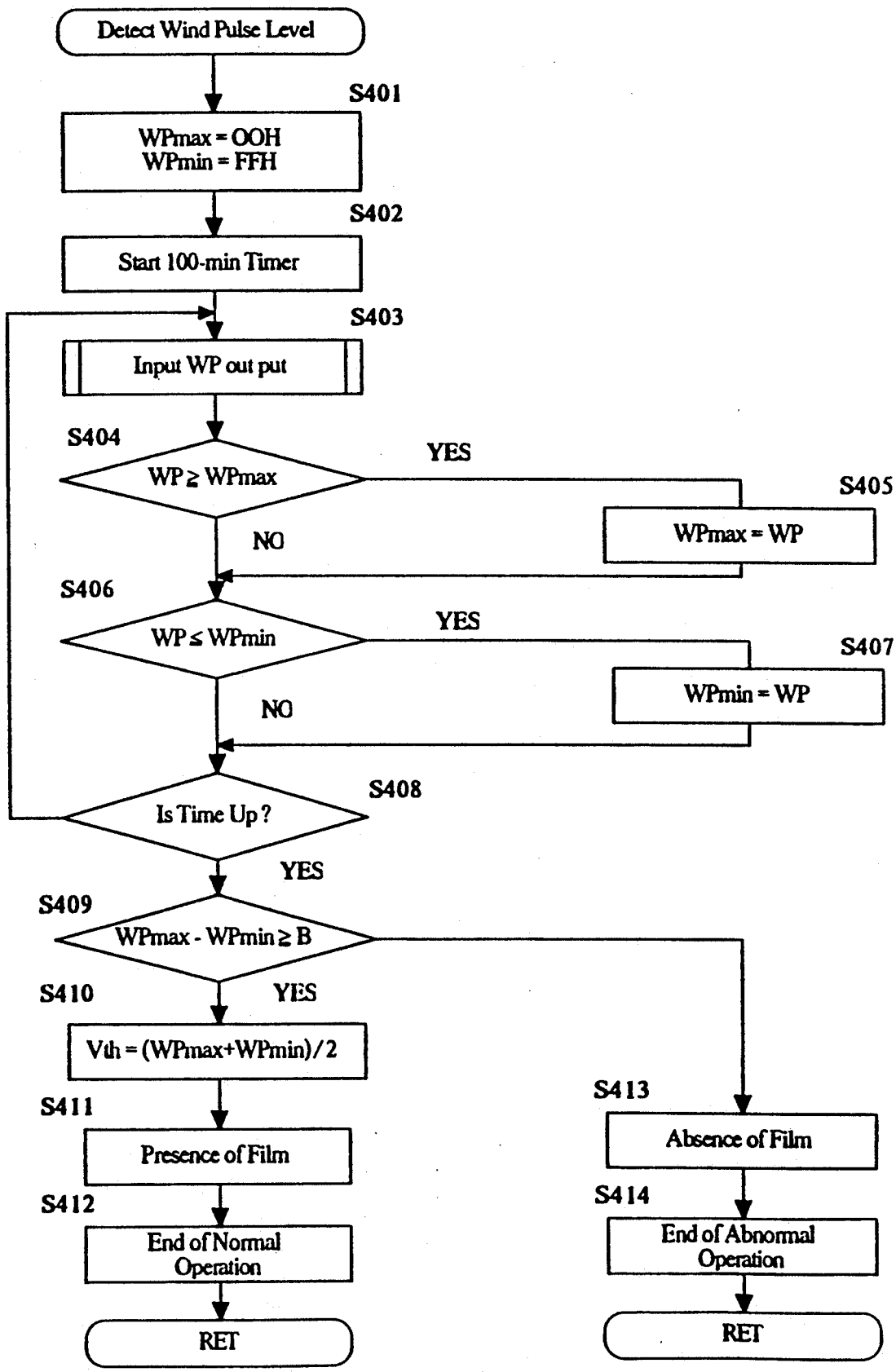
FIG. 19 is a flow chart for obtaining a reference value Vth which is used to carry out the WP detection in a camera according to the present invention.

FIG. 19 shows a flow chart of the winding pulse level detecting operation at step S303. A maximum value WPmax of the WP output is set to "00" (hexadecimal number system), and a minimum value WPmin of the WP output is set to "FF" (hexadecimal number system), respectively (step S401) Thereafter, a 100 ms timer starts (step S402), and the WP value (digital value) is fetched by the WP input operation (step S403). If the WP value thus obtained is greater than or equal to the WPmax at step S404, WPmax is substituted with the WP value (step S405). Similarly, if the WP value thus obtained is less than or equal to WPmin at step S406, WPmin is substituted by the WP value (step S407). If the WP value is between WPmin and WPmax after step 406 or after step S407, whether the set time of the 100 ms timer is up is checked at step S408. If the set time is not up, control is returned to step S403 Note that 100 ms is set to be long enough to wind the film by one pitch, corresponding to the distance between the front edges of the adjacent perforations 71 of the film 70, i.e., to obtain one cycle of WP signals.

Conversely, if the set time is up at step S408, a difference between the maximum value and the minimum value of the obtained WP values is calculated to determine whether the difference is greater than a predetermined value B (hexadecimal number system) at step S409. If the difference is less than B, it is determined that the film is not fed (step S413). Consequently, a film feeding error is indicated at step S414.

If the difference is greater than or equal to B at step 409, a mean value Vth of the maximum value and the minimum value is calculated and it is determined that the film has been fed (steps S410 and S411). Consequently, a normal film feeding is indicated at step S412.

Figure 20:
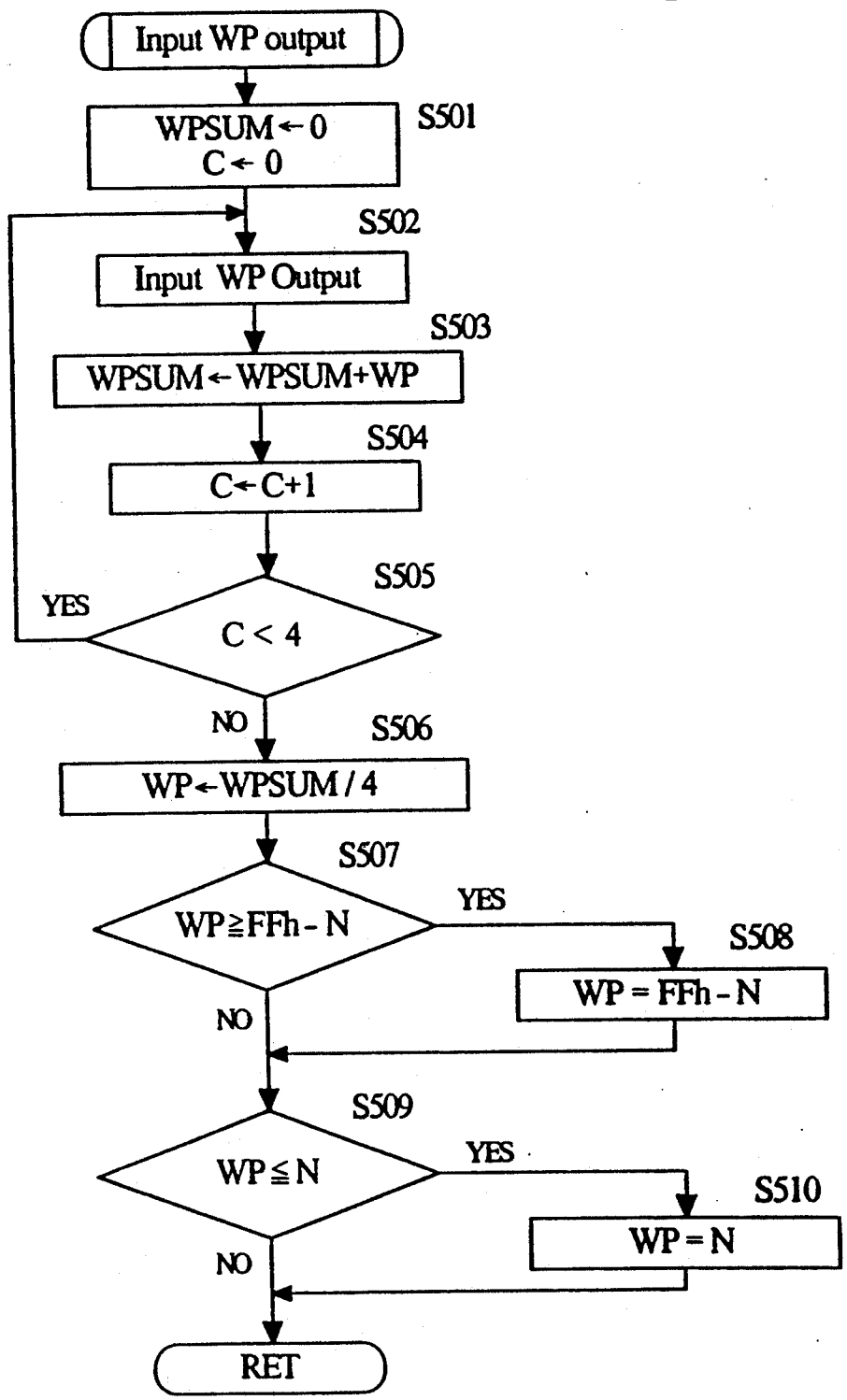
FIG. 20 is a flow chart of a WP input operation in a camera according to the present invention.

FIG. 20 shows a flow chart of the WP input operation at step S403. Variables WPSUM and C are set at an initial value "0" at step S501, and the WP value is fetched at step S502. The WP value is added to the value WPSUM and 1 is added to the value C (steps S503 and S504). Thereafter, at step S505, whether the value C is greater than 4 is checked. If the value C is less than 4, control is returned to step S502. Conversely, if the value C is greater than or equal to 4, control proceeds to step S506, at which the WP value is substituted by (WPSUM/4). In steps S502 through S506, an average value of the 4 consecutive WP signals is deemed to be a WP value that will prevent an adverse influence on the detection precision due to interference, etc.

Thereafter, whether the WP value is greater than or equal to a difference between the value "FF" (hexadecimal number system) and a predetermined value "N" (hexadecimal number system) is checked at step S507. If the WP value is greater than or equal to the difference (FF−N), the WP value is set at the value of the difference. Conversely, if the WP value is less than the difference (FF−N), the WP value remains as set. Thereafter, it is checked whether the WP value is less than or equal to the value "N" at step S509. If the WP value is less than or equal to the value "N", the WP value is set to the value "N" (step S510). Conversely, if the WP value is greater than the value "N", the WP value remains as set. This operation prevents the WP value from undesirably moving outside of the "00" to "FF" range, thus resulting in a reliable calculation.

Figure 21:
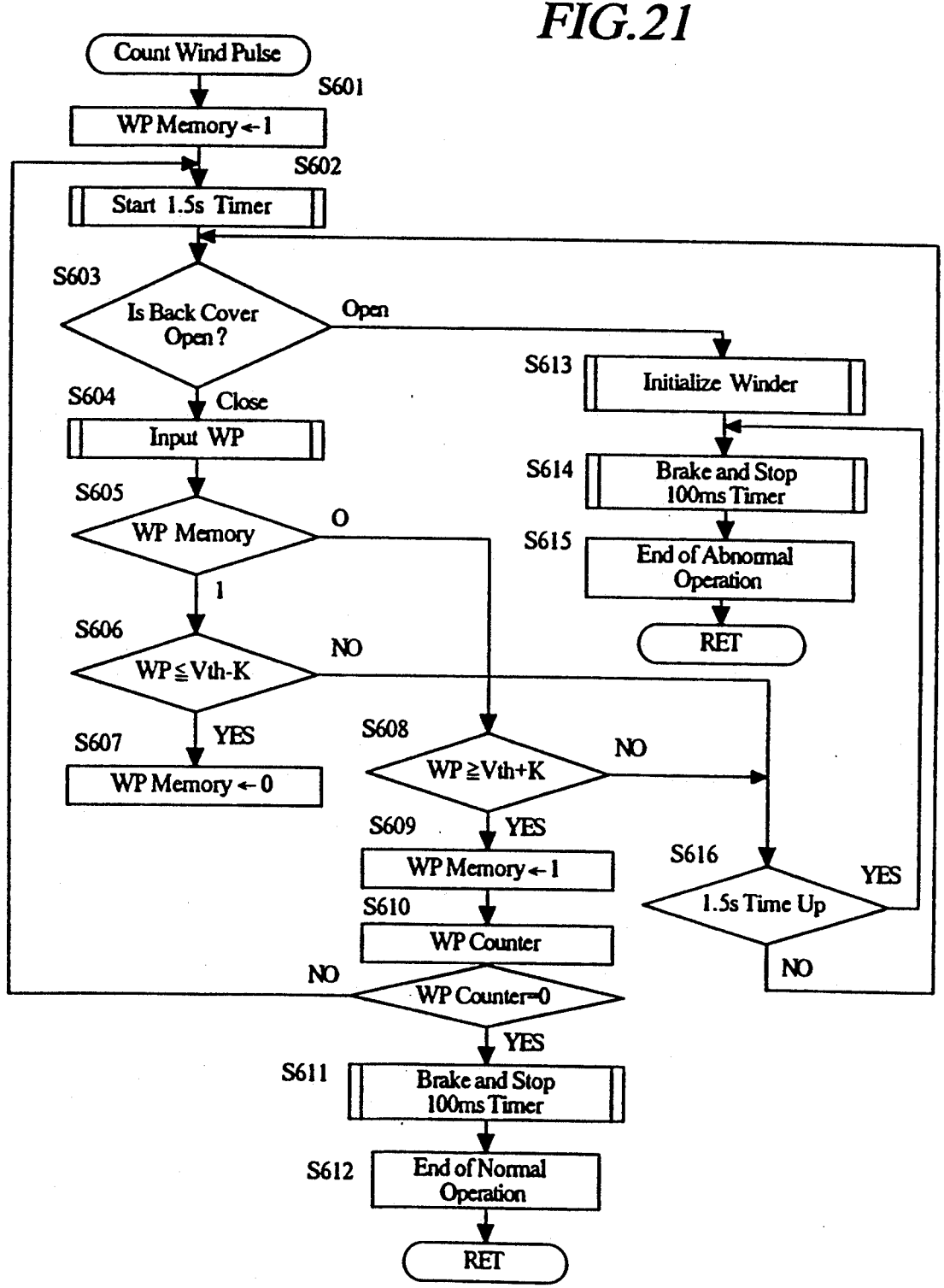
FIG. 21 is a flow chart of a WP count operation in a camera according to the present invention.

FIG. 21 is a flow chart of the WP count operation at steps S304 and S704. Note that the logic values "1" and "0" represent that the WP signal is greater than the value (Vth+K), and less than the value (Vth−K), respectively.

First, at step S601, the value "1" is stored in the internal memory RAM of the CPU 40 at a predetermined address thereof, and the 1.5 sec timer starts (step S602).

Thereafter, whether or not the back cover 8 is closed is checked at step S603. If the back cover 8 is closed, the above-mentioned WP input operation is carried out (steps S604). After that, if the WP value is "1" (step S605), the operations at steps S603~S606, S616 are repeated until the WP is equal to a difference between Vth and K (Vth−K). Namely, the operations are repeated until the WP value intersects the level of (Vth−K) in the descending portion of the WP output curve, at which point the value "0" is stored in the RAM of the CPU 40. Thereafter, control is returned to step S602 (steps S606, S607, S602). If the value "0" is stored in the RAM at step S602, the loop operations at steps S603~S605, S608, S616 are repeated until the WP value reaches the level of (Vth 30 K). If the WP is greater than or equal to (Vth+K), the value "1" is stored in the memory. Thereafter, 1 is subtracted from the WP counter. This is repeated until the WP counter becomes 0 (steps S608, S609, S610, S602). When the WP counter is 8, the winding motor 73 is braked and stopped. Thereafter, a normal indication is effected (step S612). If the WP counter is not 0, control returns to step S602 (steps S608~S612).

Thus, upon loading, when the WP output curve intersects the level of (Vth+K) 33 times at the rising portion of the curve, and when the WP is identical to 0, the winding motor 73 is stopped. Namely, it is determined that the loading operation has been completed. Accordingly, control is returned to the main flow. Upon a normal rewinding operation, when the WP output curve intersects the level of (Vth+K) 8 times at the rising portion of the curve, the winding motor 73 is stopped to finish the feeding operation of the frame of film, as will be discussed hereinafter.

Film 70 is stopped when the WP is above (Vth+K). In the subsequent winding operation, 1 is subtracted from the WP counter when the WP value is less than (Vth+K) for the first time.

If the back cover 8 is open at step S603, the number counter is set to 0, a loading errors is indicated, an indication of the completion of the rewinding is effected, the winding motor 73 is braked and stopped, and the operation error is indicated (steps S613, S614, S615). Thereafter, control is returned to the main flow.

If WP is greater than (Vth−K) at step S606, or if the WP is less than (Vth+K) at step S608, the WP curve has not intersected the threshold level, in which case control is returned to step S603 if the set time of the 1.5 sec timer is up (step S616). If the set time of the 1.5 sec timer is up at step S616, the pulse number has not been correctly counted. Accordingly, control proceeds to steps S614 and S615.

Figure 22:
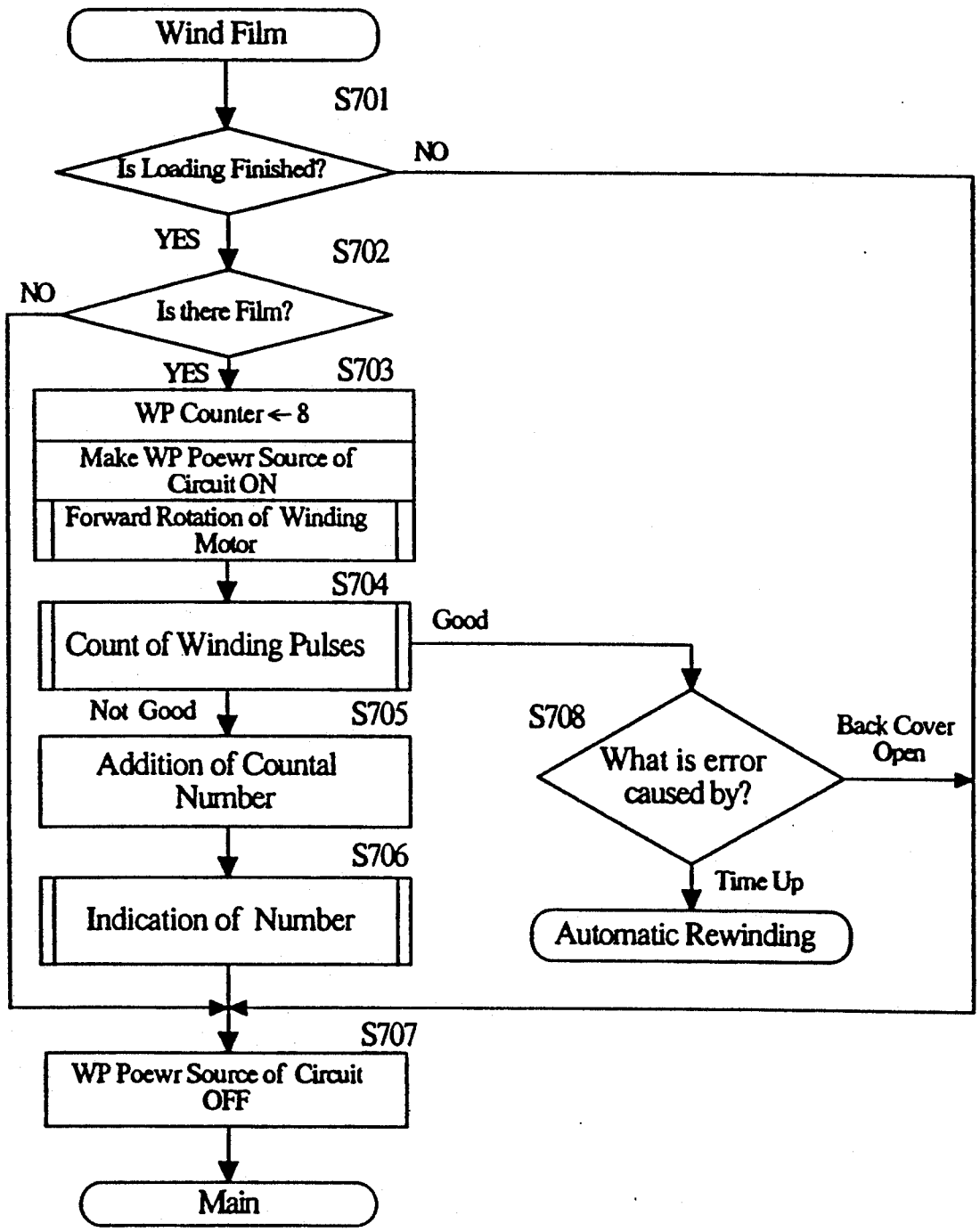
FIG. 22 is a flow chart of a film winding operation in a camera according to the present invention.

FIG. 22 shows a flow chart of the film winding operation using the WP count operation shown in FIG. 21.

At step S701, it is determined whether the loading operation has been completed. If the loading operation is completed, control proceeds to step S702 to detect the presence of a film. If a film is present, the WP counter is set to 8, the WP detection circuit 67 is supplied with power, and the winding motor 73 is rotated in the forward direction (step S703). Thereafter, the WP counter is effected to count the WP number (step S704). If the obtained value is appropriate, the number counter operates, the counted number is indicated, and the power supply to the WP detection circuit 67 is terminated (steps S705, S706, S707). Thereafter, control is returned to the main flow.

If loading is not completed at step S701, or if a film is not detected at step S702, the power supply to the WP detection circuit 67 is immediately terminated (step S707). Furthermore, if an error is detected at step S704, the cause of the error is determined at step S708. If the error is due to the back cover 8 being open, the supply of electrical power to the WP detection circuit 67 is terminated. At step S708, if the error is due to the set time of the 1.5 sec timer having expired, the automatic film rewinding operation is carried out, since it is considered that the film cannot be wound (i.e., all the frames of film have been used).

Figure 23:
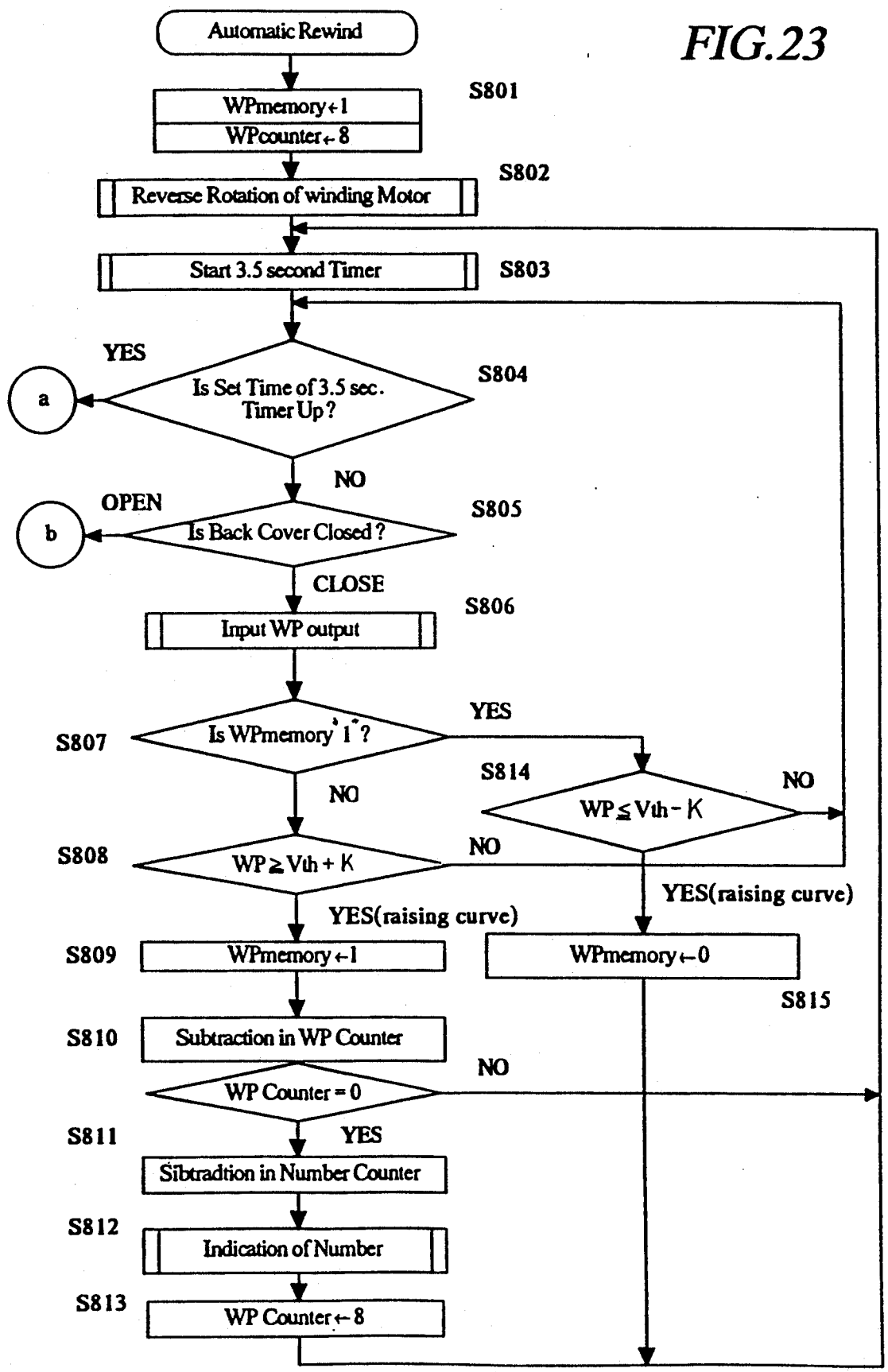
FIGS. 23 and 24 are flow charts of a film rewinding operation in a camera according to the present invention.
Figure 24:
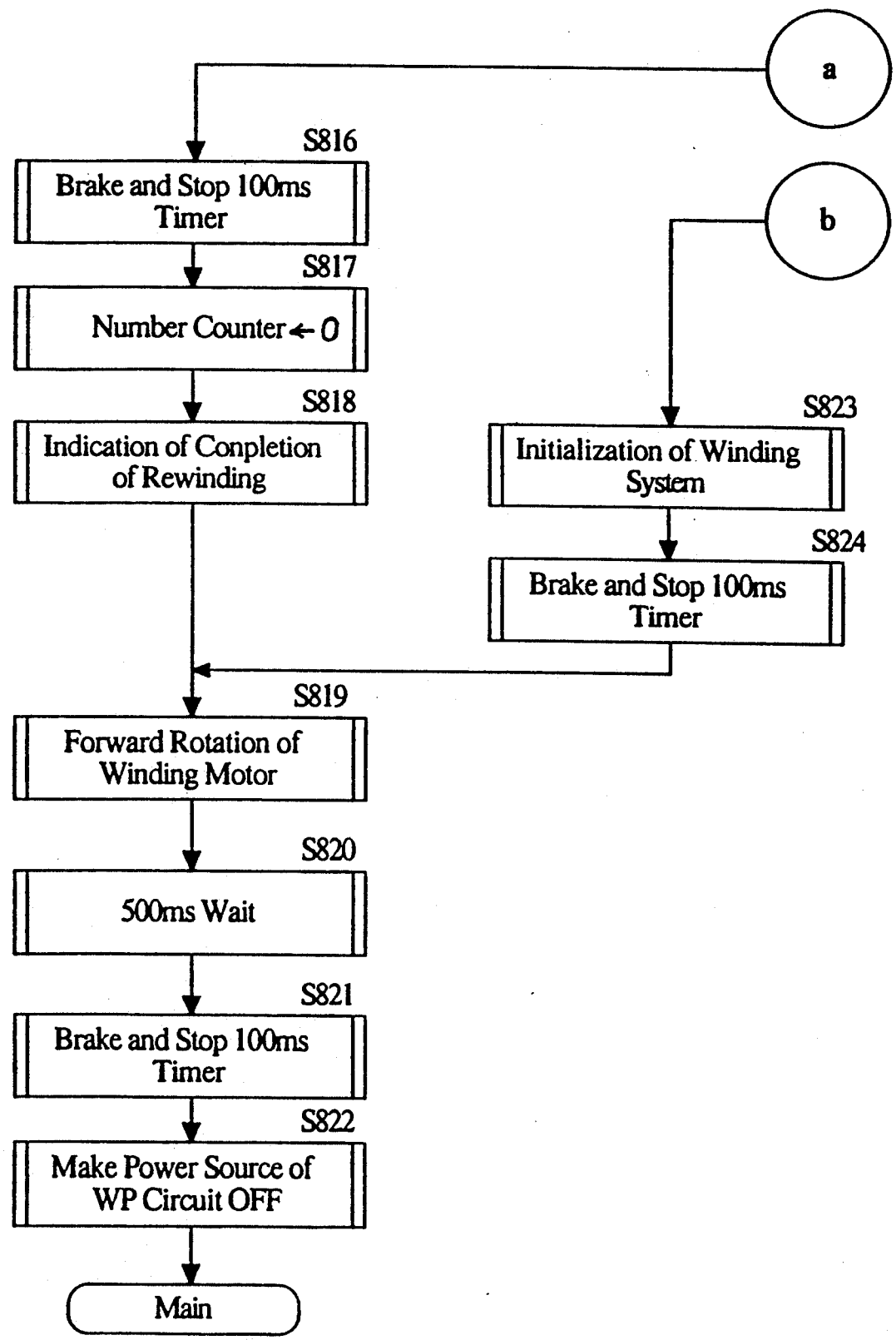

FIGS. 23 and 24 show the automatic film rewinding operation. The value "1" is stored in the WP memory (RAM), and the WP counter is set to 8 (initial value) at step S801. This is because eight perforations of the film correspond to one frame of the film. Thereafter, the film winding motor 73 is reversed, and the 3.5 sec timer starts (steps S802 and S803). Before the set time of the 3.5 sec timer is up, whether the back cover 8 is closed is checked (steps S805 and S806). If the back cover 8 is closed at step S805, the above-mentioned WP input operation is carried out (step S806). If the value "0" is stored in the WP memory (i.e., in the rising portion of the WP output curve), whether the WP output is above the predetermined threshold value (Vth+K) is checked at step S808. If the WP output is equal to or above the threshold value (Vth+K), the value "1" is stored in the WP memory (step S809). Thereafter, the subtraction operation in the WP counter is effected until the value is 0 (step S810). When the WP counter becomes 0, the subtraction operation in the number counter is effected, the number is indicated, and the value of the WP counter is substituted by the initial value, i.e., 8 (steps S811, S812 and S813). Thereafter, control is returned to step S803.

If the WP counter does not reach 8 at step S810, control is returned to step S803.

If the value "1" is stored in the WP memory at step S807, no operation is carried out until the WP value becomes less than the small threshold value (Vth−K) to detect the descending portion of the WP output curve (steps S807, S814 and S804). If the WP value is less than the threshold value (Vth−K), the value "0" is set in the WP memory. Control is then returned to step S803 (steps S807, S814, S815, S803).

If the set time of the 3.5 sec timer is up at step S804, the winding motor 73 is stopped, the number counter is reset to 0, and the completion of the rewinding operation is indicated (steps S804, S816~S818). Thereafter, the winding motor 73 is rotated in the forward direction to bring the gear into the winding position, so that a new patrone can be easily charged (step S819). Thereafter, rotation of the winding motor in the forward direction lasts for 500 ms (step S820). After that, the winding motor 73 is braked and stopped (step S821), and the power supply to the WP detection circuit 67 is terminated at step S822.

If the back cover 8 is detected to be open at step S805, the film winding system is initialized as mentioned above. Thereafter, the winding motor 73 is stopped (steps S823 and S824). Control then proceeds to step S819.

Figure 25:
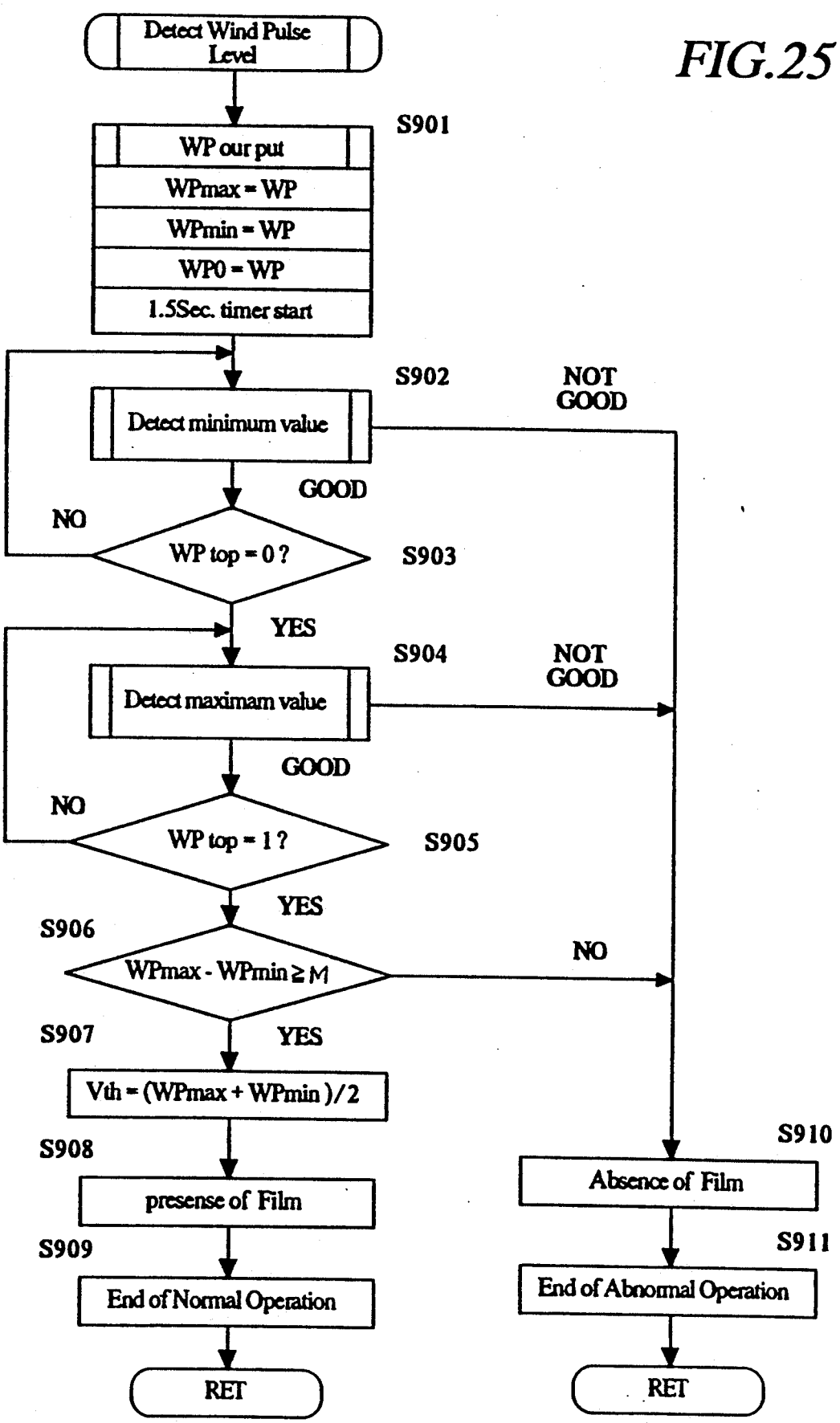
FIG. 25 is a flow chart for obtaining a reference value Vth which is used to carry out a WP detection in a camera according to another aspect of the present invention; and, FIG. 26 is a flow chart of a maximum and minimum value detecting operation in a flow chart shown in FIG. 25.
Figure 26:
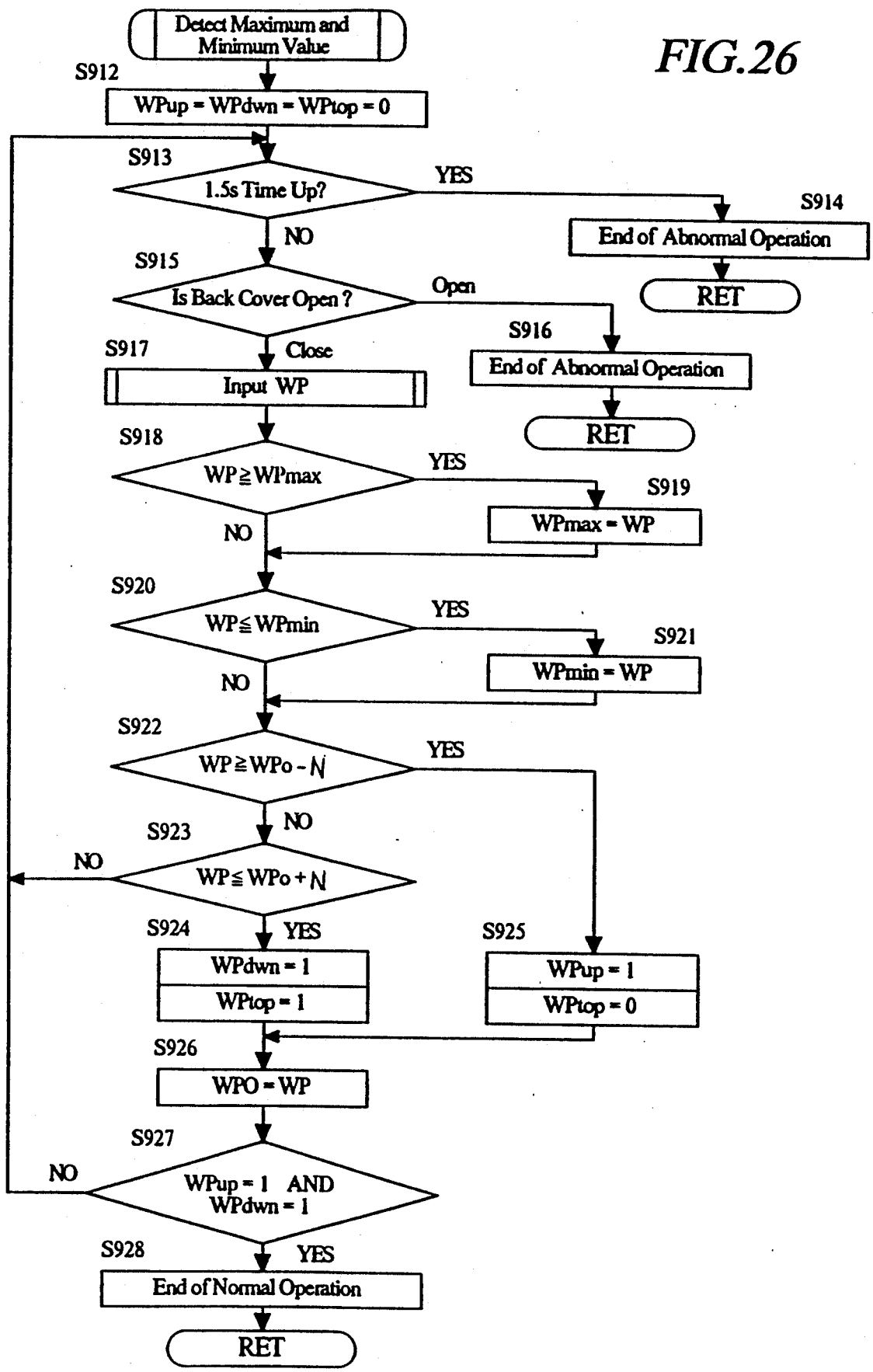

The following discussion will be directed to a WP detecting operation according to a second embodiment of the present invention (see FIGS. 25 and 26).

FIG. 25 shows a flow chart of a winding pulse level detecting operation. At step S901, the WP inputting operation, which will be discussed below, is carried out. WPmax, WPmin, and WPo are substituted by the respective inputted WP output signals, and the 1.5 sec timer starts. Thereafter, the minimum value is detected, as will be described below at step S902. If the detection of the minimum value is properly completed, whether a variable WPtop, which is defined in the course of the detection of the maximum and minimum values, is zero is checked. In other words, whether the minimum value is detected is checked at step S903. These operations at steps S902 and S903 are repeated until the variable WPtop is zero. If the minimum value is detected, the maximum value is detected in a manner similar to the detection of the minimum value (steps S904 and S905).

If the maximum value of WP is detected, whether a difference between the maximum value WPmax and the minimum value WPmin is greater than or equal to a predetermined value "M" is checked (step S906). If the difference is above "M", the value Vth is set to be a mean value of WPmax and WPmin, and it is determined that the film is correctly fed, and a normal operation is carried out (step S907, S908 and S909). If neither the minimum value nor the maximum value is detected at S902 or S904, respectively, or if a difference between the maximum value WPmax and the minimum value WPmin is below "M" at step S906, it is determined that the film feeding operation is incorrectly effected, so that the abnormality is brought to a stop (step S910 and S911).

FIG. 26 shows a flow chart of the maximum and minimum value detecting operations at steps S902 and S904 in FIG. 24. At step S912, three variables WPup, WPdwn and WPtop are set at 0. Thereafter, whether the set time of the 1.5 sec timer has expired, which started in the WP detection operation, is checked at step S913. If the time has not expired, whether the back cover 8 is closed is checked (step S915). If the back cover 8 is closed, the WP inputting operation is carried out. Thereafter, WPmax and WPmin are substituted by the maximum and minimum values of the fetched WP outputs (steps S913, S915, S917~S921).

Thereafter, whether the WP value is incremented by more than "N" with respect to the preceding value WPo (WP≧WPo+N) is checked at step S922, corresponding to steps S902 and S903 in FIG. 25. If WP≧WPo+N, WPup and WPtop are set to be 1 and 0, respectively (step S925). Thereafter, the preceding value WPo is renewed (step S926).

After that, control is returned to step S913 from step S927, since WPup is still identical to 0. If the WP output is incremented by more than "N" after the incrementing of the WP output has ended, WPup is set at 1, and the normal operation is carried out (steps S922, S925~S928). Thus, the minimum value is detected, and WPmin is substituted by the WP value corresponding thereto.

At step S923, corresponding to steps S904 and S905, whether there is a decrement of the WP by more than "N" with respect to the preceding value WPo (WP≧WPo−N) is checked. If WP<WPo−N, Wpdwn and WPtop are each set to be 1 (step S924). Thereafter, the preceding value WPo is renewed (step S926). Control is then returned to step S913 from step S927, since WPdwn is still 0. If the WP value is decremented by more than "N" after the increase of the WP output has ended, WPtop is set at 1, and the normal operation is carried out (steps S922, S923~S928). Thus, the maximum value is detected, and WPmax is substituted by the WP value corresponding thereto.

As can be seen from the above discussion, according to the present invention, since the number of perforations of the film is counted by the photoelectric element, physical resistance is not applied to the film, resulting in a reliable and precise detection of the feed position of the film. Furthermore, since the output signals of the photoelectric element are determined based on a mean value thereof, a precise and reliable detection of the number of perforations can be expected. In particular, according to an aspect of the present invention, the number of pulses is counted by detecting the times at which the output curve intersects the different threshold values at the rising and descending portions of the output signals of the photoelectric element, so that the number of perforations of the film can be precisely counted even if, for example, interference exists.

According to another aspect of the present invention, since the winding pulse output signals of the photoelectric element are detected based on the mean value of the detected maximum and minimum values of the output signals of the photoelectric element, the number of perforations of the film can be precisely and reliably effected at very high speed.

We claim:

1. A film winding apparatus for a camera that includes a film feeding means for winding a perforated film, comprising:
   a photoelectric member opposed to perforations of said film to detect a presence or absence of said perforations;
   means for setting an upper threshold value and a lower threshold value with respect to a predetermined set reference value in accordance with an initial signal outputted from said photoelectric member upon a film feeding operation of said film feeding means; and
   means for detecting a feed position of said film by comparing a rising output curve and a descending output curve produced by said photoelectric member with said upper and lower threshold values of said predetermined set reference value after said predetermined set reference value has been set.

2. The film winding apparatus of claim 1, wherein said reference value setting means calculates a means value of said initial output signal during a predetermined period of time of said film feeding operation, so that said predetermined set reference value is set based on said mean value thus obtained.

3. The film winding apparatus of claim 2, wherein said photoelectric member comprises a light emitting element which emits light towards said film in a vicinity of said perforations, and a light receiving element which receives light emitted by said light emitting element and reflected from said film.

4. The film winding apparatus of claim 3, wherein a quantity of light received by said light receiving element is a minimum when said light emitted from said light emitting element is incident upon a center of said perforations, and is a maximum when said light emitted from said light emitting element is incident upon portions of said film that are located between adjacent perforations.

5. The film winding apparatus of claim 4, wherein said reference value setting means detects said minimum and maximum values of initial output signals of said light receiving element during a movement of said film between two perforations, upon a loading of said film by said film feeding means, so that said predetermined set reference value can be set in accordance with a mean value of said maximum and minimum value thus obtained.

6. The film winding apparatus of claim 5, wherein said reference value setting means sets a first reference value corresponding to said upper threshold value when said initial output signal defines said rising output curve, and sets a second reference value corresponding to said lower threshold value when said initial output signal defines descending output curve.

7. The film winding apparatus of claim 6, wherein said first reference value is greater than said mean value when an output of said light receiving element is increasing.

8. The film winding apparatus of claim 7, wherein said second reference value is less than said means value.

9. The film winding apparatus of claim 8, wherein said detecting means determines the presence of a perforation every time said detecting means detects that said rising output curve has moved above said first reference value after said descending output curve has moved below said second reference value.

10. The film winding apparatus of claim 9, wherein said film feeding means stops feeding said film when said detecting means detects that said film has been fed through a predetermined number of perforations.

11. The film winding apparatus of claim 9, wherein said detecting means determines that said film is fed through one perforation every time said detecting means detects that said output signal has moved above said first reference value after said output signal has been detected to have moved below said second reference value in a case where said film feeding means operates a second time after said film feeding means stops upon detecting said predetermined number of perforations.

12. The film winding apparatus of claim 5, wherein said film comprises a 35 mm film, so that said film, upon loading is fed by a displacement corresponding to 35 perforations.

13. The film winding apparatus of claim 12, wherein said film feeding means stops a winding operation of said film when said detecting means detects a movement of said film by a displacement corresponding to 8 perforations upon winding said film.

14. The film winding apparatus of claim 1, wherein said reference value setting means detects a maximum and minimum value of said initial output signal of said photoelectric member upon a feeding of said film to set a predetermined reference value in accordance with said maximum and minimum values.

15. The film winding apparatus of claim 1, wherein said reference value setting means detects a pair of maximum and minimum values of said initial output signal of said photoelectric member upon a loading of said film to set a predetermined reference value in accordance with said maximum and minimum values.

16. An apparatus for detecting a winding of a film having a plurality of perforations, comprising:
means for producing a signal output curve representing presence and absence of a perforation on said film as said film is wound;
means for setting an upper threshold value of said signal output curve;
means for setting a lower threshold value of said signal output curve; and
means for counting said perforations as said film is wound in response to said signal output curve rising to said upper threshold value after said signal output curve has descended to said lower threshold value.

17. The apparatus of claim 16, further comprising means for obtaining a reference value for each type of film by averaging a minimum value of said signal output curve and a maximum value of said signal output curve upon said winding of said film.

18. The apparatus of claim 16, further comprising means for obtaining a reference value for each type of film by averaging a minimum value of said signal output curve and a maximum value of said signal output curve upon a loading of said film.

19. An apparatus for determining a position of a film having a plurality of perforations along a length of said film, comprising:
means for winding said film;
a detector that is proximate said film that outputs a signal representing presence and absence of said perforations as said film is wound;
means for setting a predetermined reference value of said signal output by said detector as said film is wound, an upper threshold value being determined by adding a fixed value to said predetermined value, a lower threshold value being determined by subtracting said fixed value from said predetermined value; and
means for counting said perforations as said film is wound in response to said signal output by said detector reaching said upper threshold value after said signal output by said detector has reached said lower threshold value.

20. The apparatus of claim 19, wherein said predetermined reference value comprises means for averaging a minimum and maximum value of said signal output by said detector as said film is wound.

21. The apparatus of claim 19, wherein said predetermined reference value comprises means for averaging a minimum and maximum value of said signal output by said detector upon a loading of said film.

22. The film winding apparatus of claim 1, wherein said upper threshold value is set by adding a fixed value to said predetermined set reference value, said lower threshold value being set by subtracting said fixed value from said predetermined set reference value.

23. The apparatus of claim 16, wherein said upper threshold value is set by adding a fixed value to a predetermined set reference value, said lower threshold value being set by subtracting said fixed value from said predetermined set reference value.

* * * * *

UNITED STATES PATENT AND TRADEMARK OFFICE
CERTIFICATE OF CORRECTION

PATENT NO. : 5,323,198
DATED : June 21, 1994
INVENTOR(S) : Y. TABATA et al.

It is certified that error appears in the above-indentified patent and that said Letters Patent is hereby corrected as shown below:

On the title page, item: [56] of the printed patent, line 4 FOREIGN PATENT DOCUMENTS, "57-04529" should be changed to ---57-204529---.

Signed and Sealed this

Eighth Day of October, 1996

Attest:

BRUCE LEHMAN

Attesting Officer      Commissioner of Patents and Trademarks